United States Patent
Beer et al.

(10) Patent No.: US 11,034,534 B2
(45) Date of Patent: Jun. 15, 2021

(54) APPARATUS AND METHOD FOR HANDLING MOVING PIECE GOODS, AND A CONVEYING, PROCESSING AND/OR PACKAGING PLANT WITH AN APPARATUS FOR HANDLING MOVING PIECE GOODS

(71) Applicant: KRONES Aktiengesellschaft, Neutraubling (DE)

(72) Inventors: Erhard Beer, Ebbs (AT); Arsalan Mehdi, Rosenheim (DE); Michael Astner, Brannenburg (DE); Manuel Kollmuss, Raubling (DE)

(73) Assignee: KRONES Aktiengesellschaft, Neutraubling (DE)

( * ) Notice: Subject to any disclaimer, the term of this patent is extended or adjusted under 35 U.S.C. 154(b) by 255 days.

(21) Appl. No.: 16/309,277

(22) PCT Filed: Feb. 21, 2017

(86) PCT No.: PCT/EP2017/053880
§ 371 (c)(1),
(2) Date: Dec. 12, 2018

(87) PCT Pub. No.: WO2018/015029
PCT Pub. Date: Jan. 25, 2018

(65) Prior Publication Data
US 2019/0308823 A1    Oct. 10, 2019

(30) Foreign Application Priority Data
Jul. 21, 2016   (DE) ................. 10 2016 213 400.0

(51) Int. Cl.
*G06F 7/00* (2006.01)
*B65G 47/90* (2006.01)
(Continued)

(52) U.S. Cl.
CPC ........... *B65G 47/905* (2013.01); *B65G 43/08* (2013.01); *B65G 47/086* (2013.01); *B65G 65/02* (2013.01); *B65G 2203/044* (2013.01)

(58) Field of Classification Search
CPC .... B65G 47/905; B65G 47/086; B65G 43/08; B65G 65/02; B65G 2203/044
(Continued)

(56) References Cited

U.S. PATENT DOCUMENTS 4,623,296 A * 11/1986 McGuire ................ B65G 47/91
156/362
5,119,981 A * 6/1992 Gnuechtel ............ B65H 23/038
226/15
(Continued)

FOREIGN PATENT DOCUMENTS

CN    101637908 A    2/2010
CN    101872423 A    10/2010
(Continued)

OTHER PUBLICATIONS

PCT/EP2017/053880 dated Feb. 21, 2017—International Search Report dated Jun. 12, 2017.
(Continued)

*Primary Examiner* — Yolanda R Cumbess
(74) *Attorney, Agent, or Firm* — Simmons Perrine Moyer Bergman PLC

(57) ABSTRACT

The invention relates to an apparatus (10) and method for handling moved piece goods (2), and a conveying, processing, and/or packaging plant including the apparatus (10). The apparatus (10) comprises at least one manipulator (5) for piece goods (2), at least one transport device (3) by which the moved piece goods (2) are transportable to a seizing range (4) of the at least one manipulator (5), and at least one movable optical detection device (40) assigned to
(Continued)

the seizing range (4) and/or to a movement range of the at least one manipulator (5). The optical detection device (40) obtains space coordinates and/or position data and/or contour data of at least one piece good (2) that is being moved. The at least one manipulator (5) and/or further conveyor components of the apparatus (10) can be calibrated and/or controlled based on the detected space coordinates and/or position data and/or contour data.

22 Claims, 13 Drawing Sheets

(51) Int. Cl.
  *B65G 65/02* (2006.01)
  *B65G 47/08* (2006.01)
  *B65G 43/08* (2006.01)
(58) Field of Classification Search
  USPC .................. 700/213, 230, 228, 229, 245
  See application file for complete search history.

(56) References Cited

U.S. PATENT DOCUMENTS

| | | | |
|---|---|---|---|
| 5,123,231 A | 6/1992 | Fallas et al. | |
| 5,256,029 A * | 10/1993 | Fluck | B65B 23/14 414/792.9 |
| 5,464,088 A | 11/1995 | Koerber | |
| 8,448,411 B2 | 5/2013 | Huber et al. | |
| 8,961,094 B2 | 2/2015 | Rüth et al. | |
| 9,051,132 B2 | 6/2015 | Loecht et al. | |
| 9,387,992 B2 | 7/2016 | Boschi et al. | |
| 9,475,660 B2 | 10/2016 | Batrin et al. | |
| 2003/0118436 A1 * | 6/2003 | Kameda | B65G 61/00 414/799 |
| 2005/0246056 A1 | 11/2005 | Marks et al. | |
| 2006/0099064 A1 * | 5/2006 | Anaki | B65G 49/068 414/797 |
| 2014/0017048 A1 * | 1/2014 | Mattern | G06T 1/0014 414/567 |
| 2016/0167227 A1 * | 6/2016 | Wellman | B25J 9/1612 700/259 |

FOREIGN PATENT DOCUMENTS

| | | |
|---|---|---|
| CN | 202007039 U | 10/2011 |
| CN | 104786226 A | 7/2015 |
| CN | 204748652 U | 11/2015 |
| DE | 20108401 U1 | 9/2002 |
| DE | 10155596 A1 | 7/2003 |
| DE | 60200953 | 9/2004 |
| DE | 102009043970 A1 | 3/2011 |
| DE | 102010020847 A1 | 11/2011 |
| DE | 102013204095 A1 | 9/2014 |
| EP | 1260469 A1 | 11/2002 |
| EP | 1456101 A1 | 9/2004 |
| EP | 1465101 A2 | 10/2004 |
| EP | 1927559 A1 | 6/2008 |
| WO | 2015014559 A1 | 2/2015 |

OTHER PUBLICATIONS

First Chinese Office Action dated Dec. 30, 2019.
Second Chinese Office Action dated Jun. 26, 2020.
PCT Application: PCT/EP2017/053880—International Preliminary Report on Patentability dated Jan. 22, 2019.
Priority Application: DE 10 2016 213 400.0 Filed Jul. 21, 2016—German Search Report dated Oct. 6, 2020.

* cited by examiner

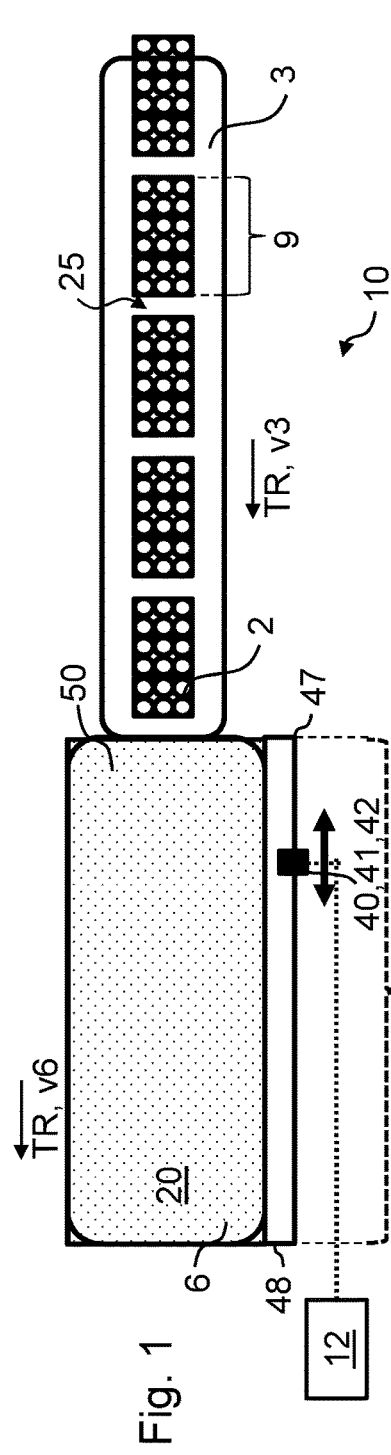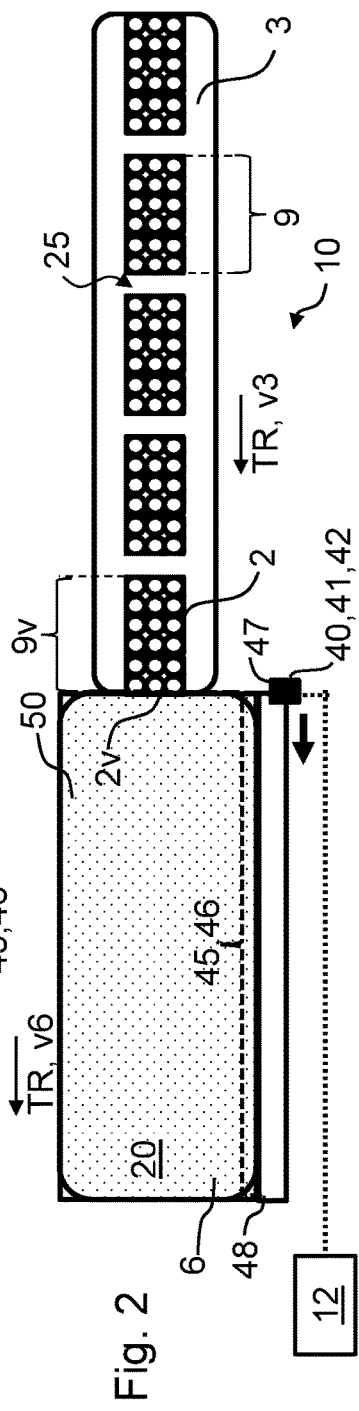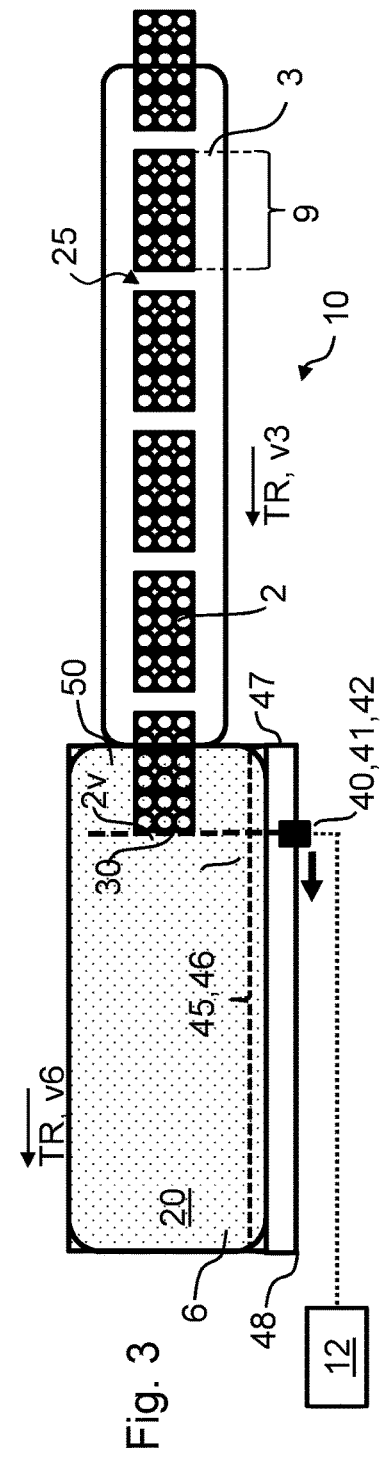

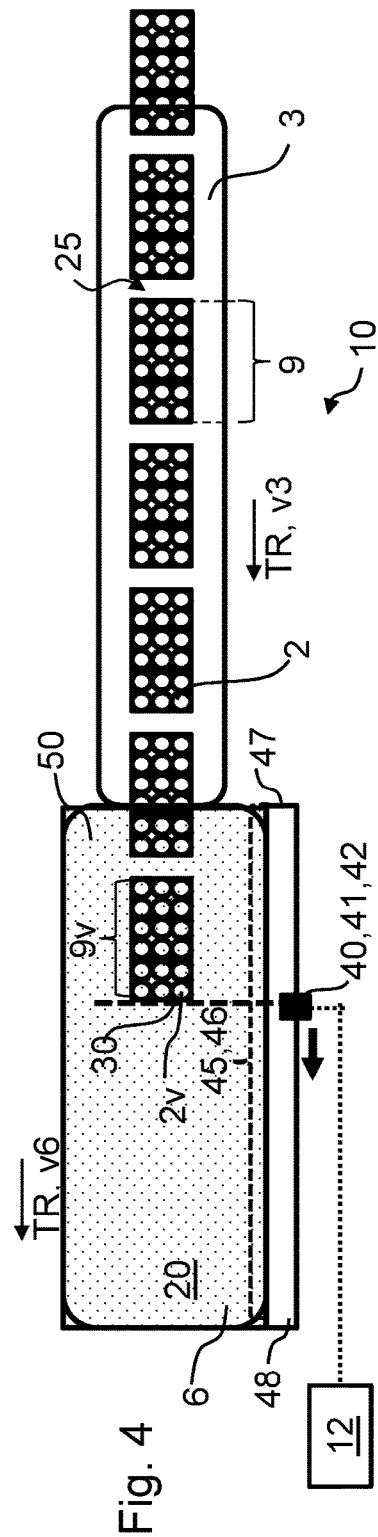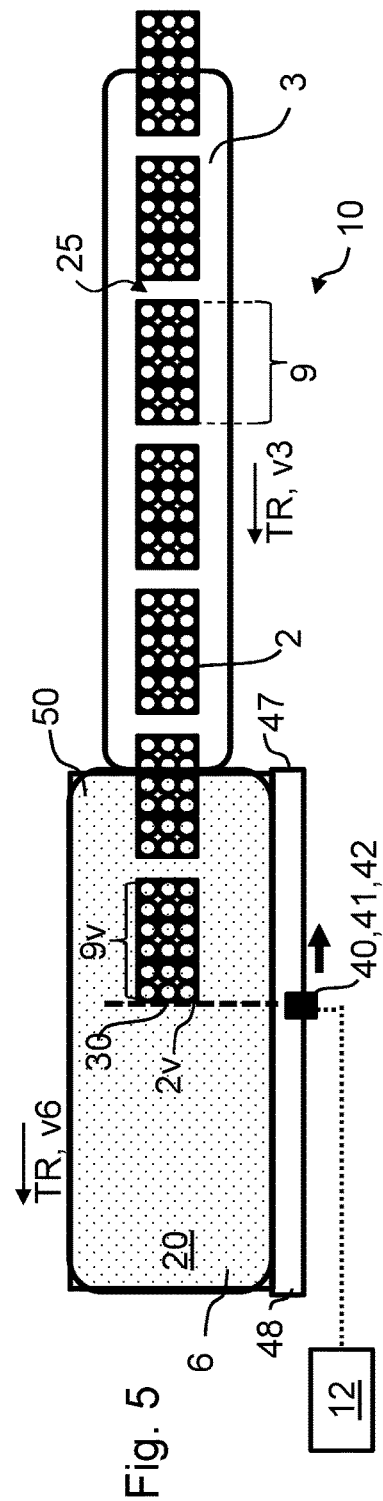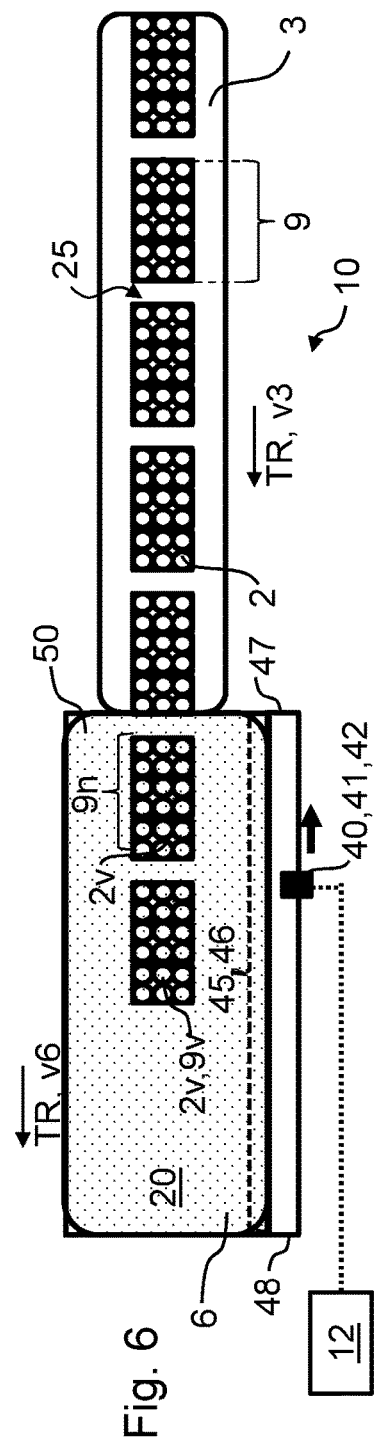

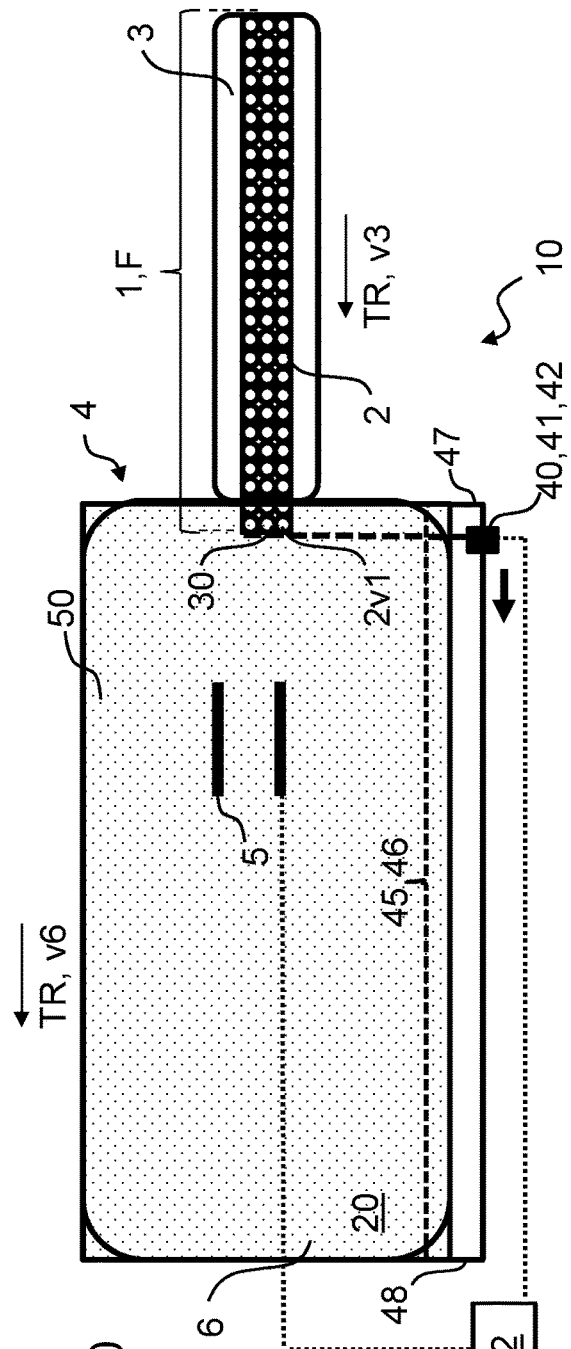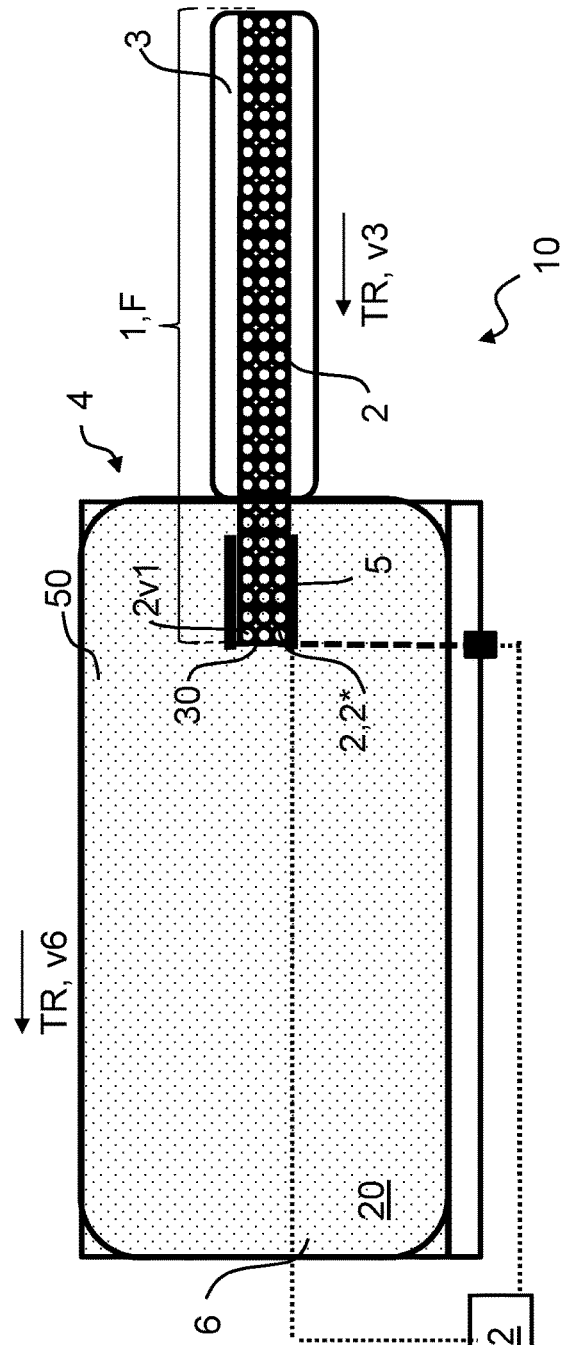

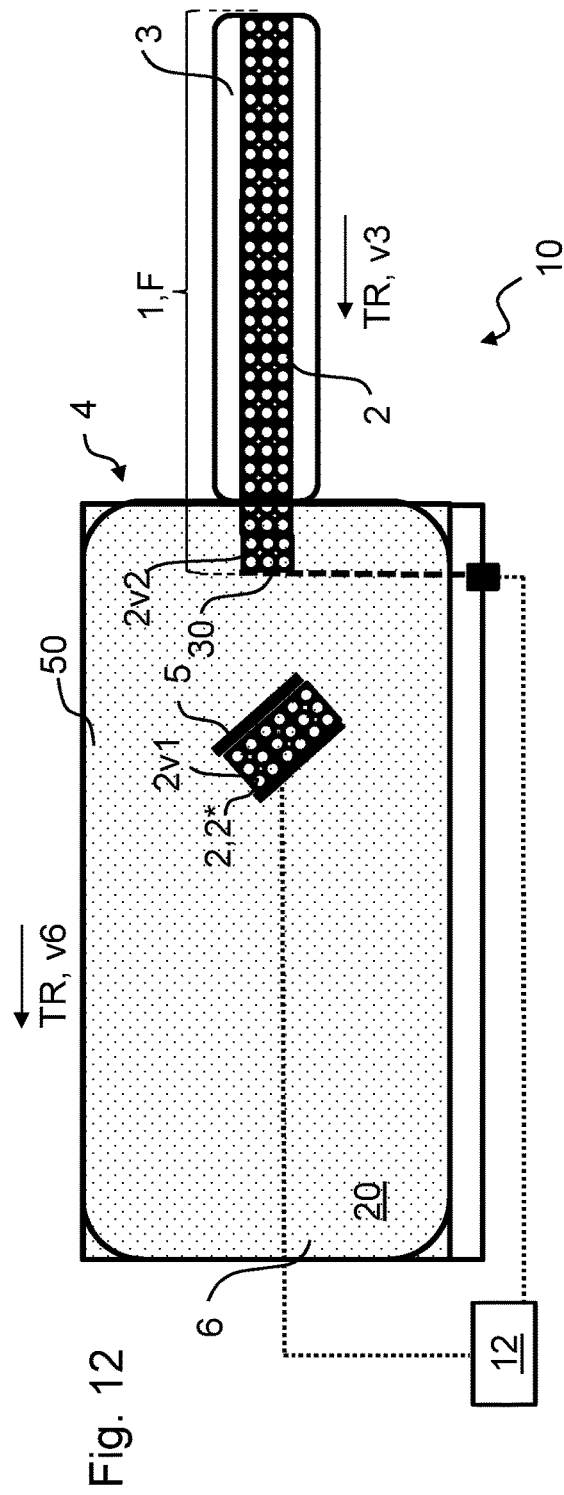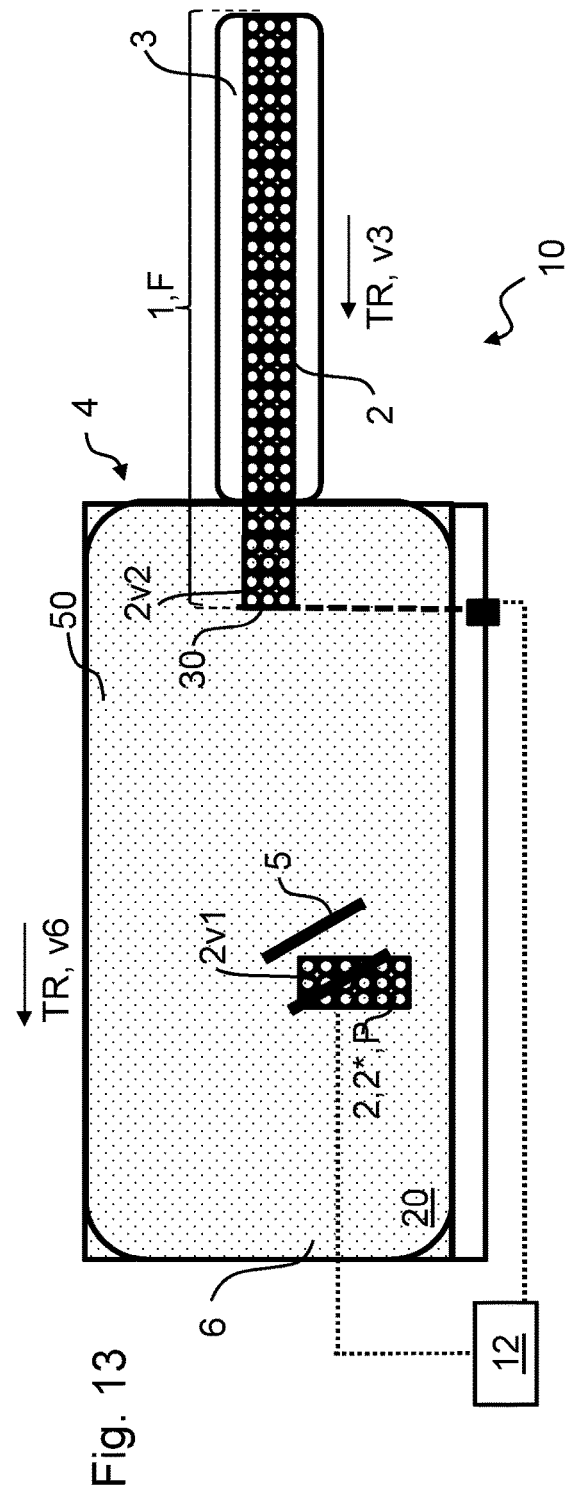

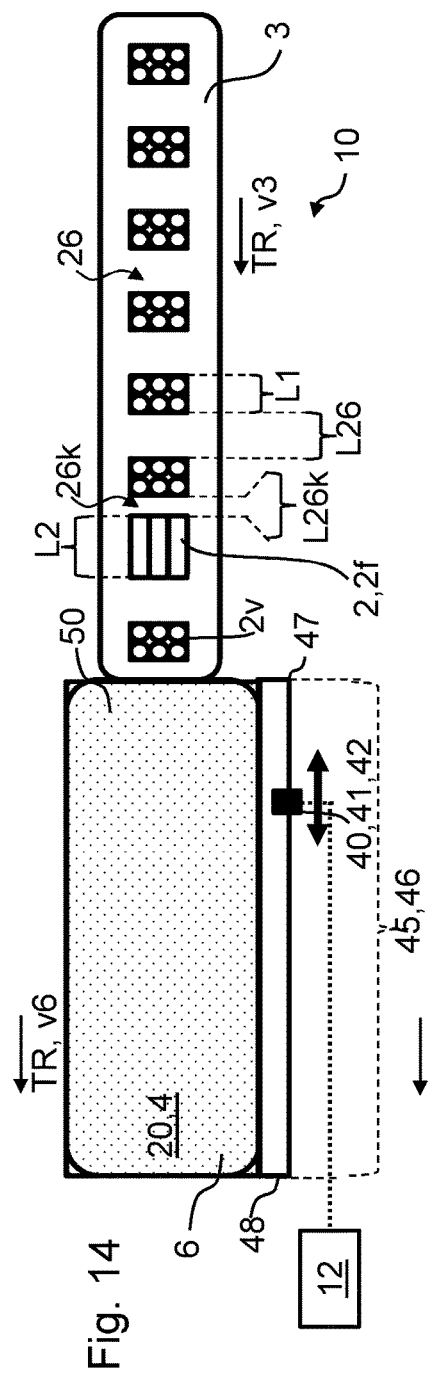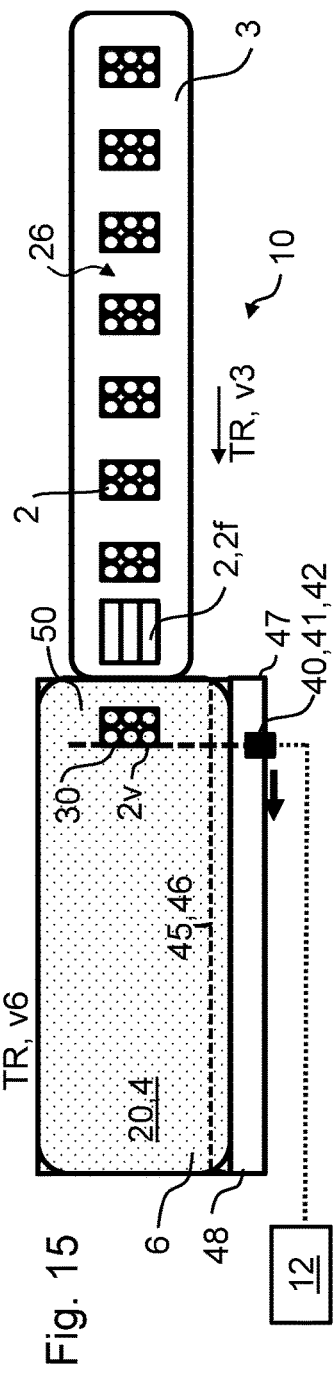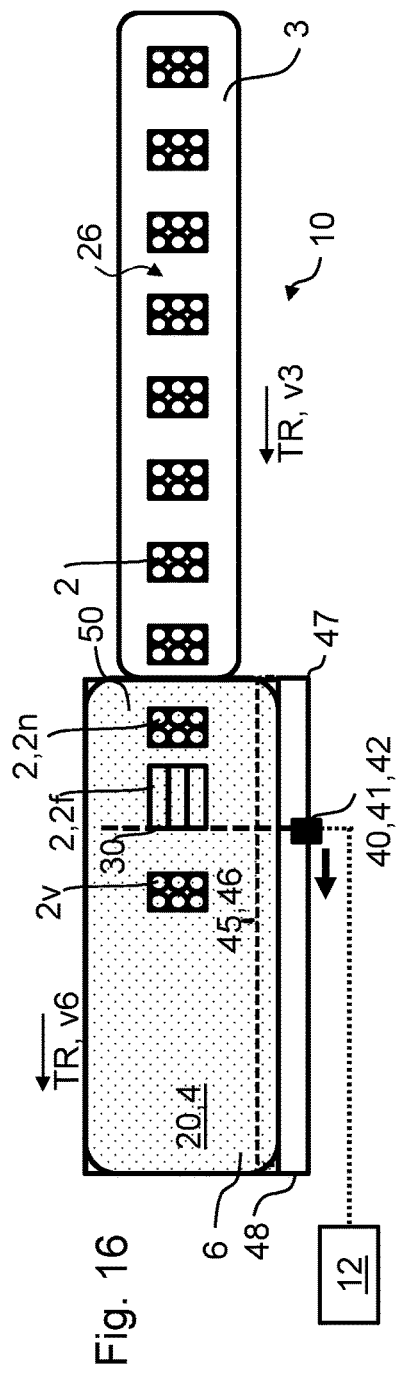

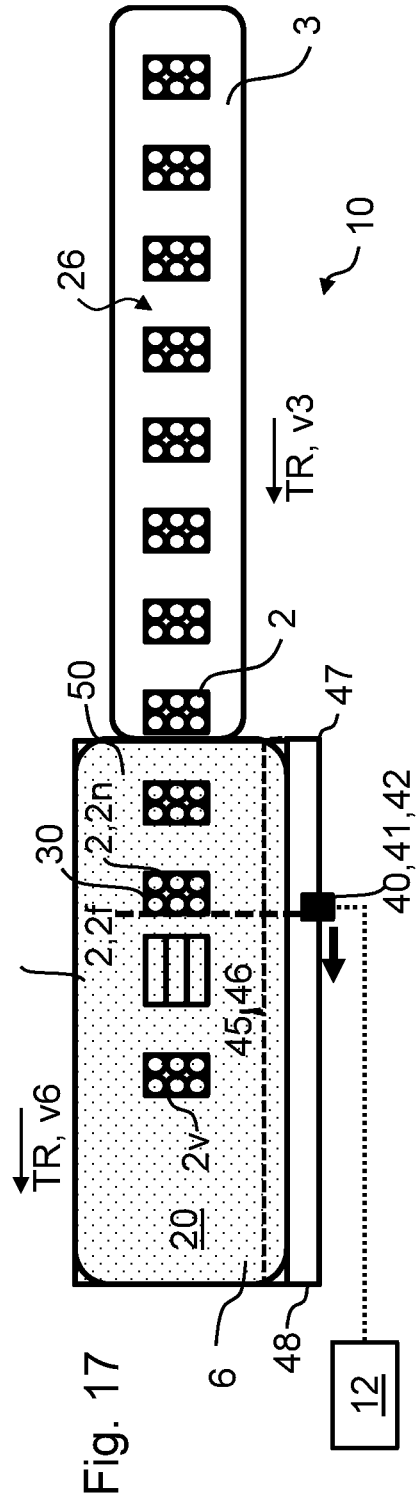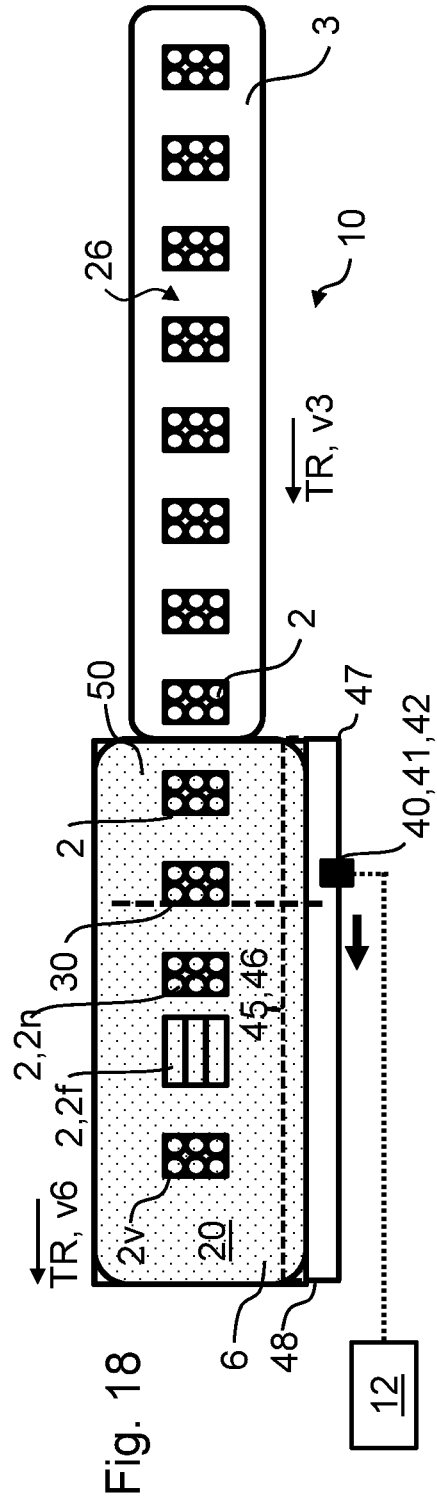

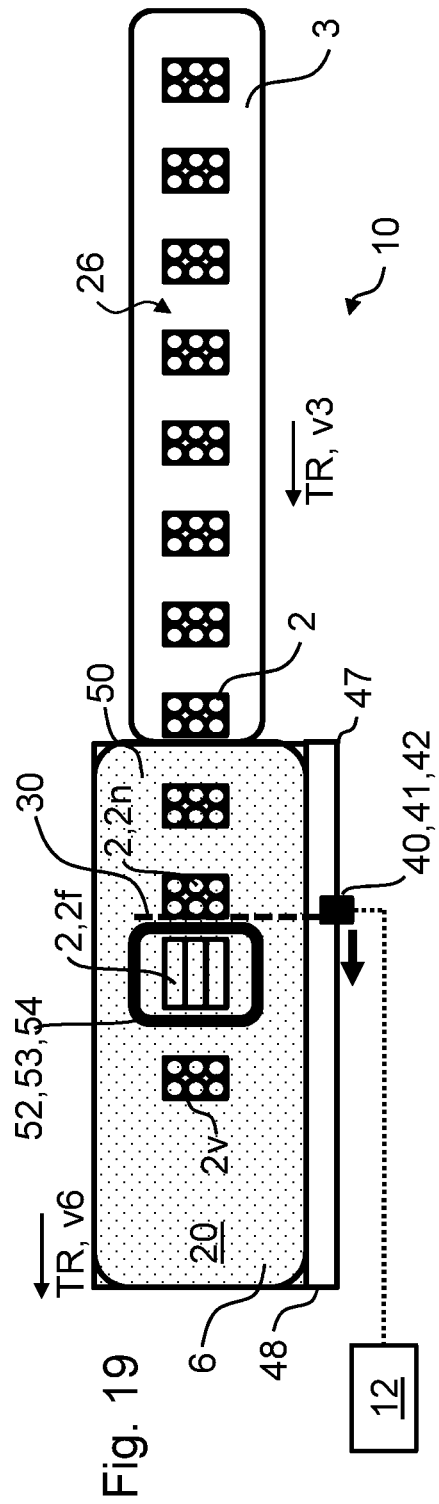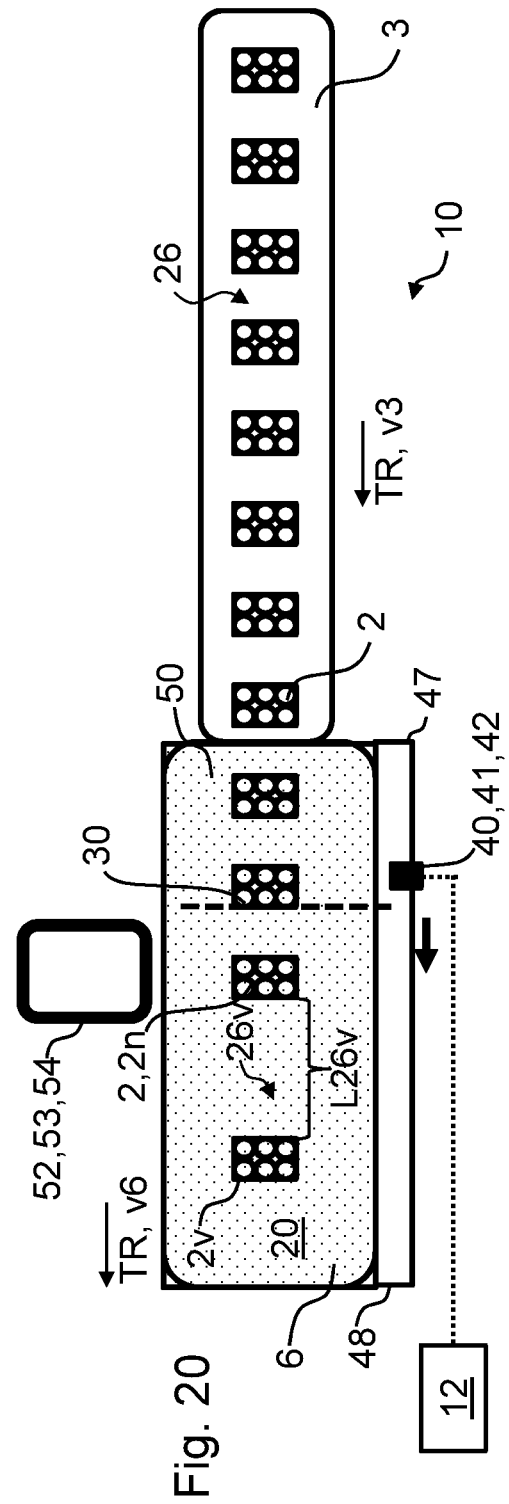

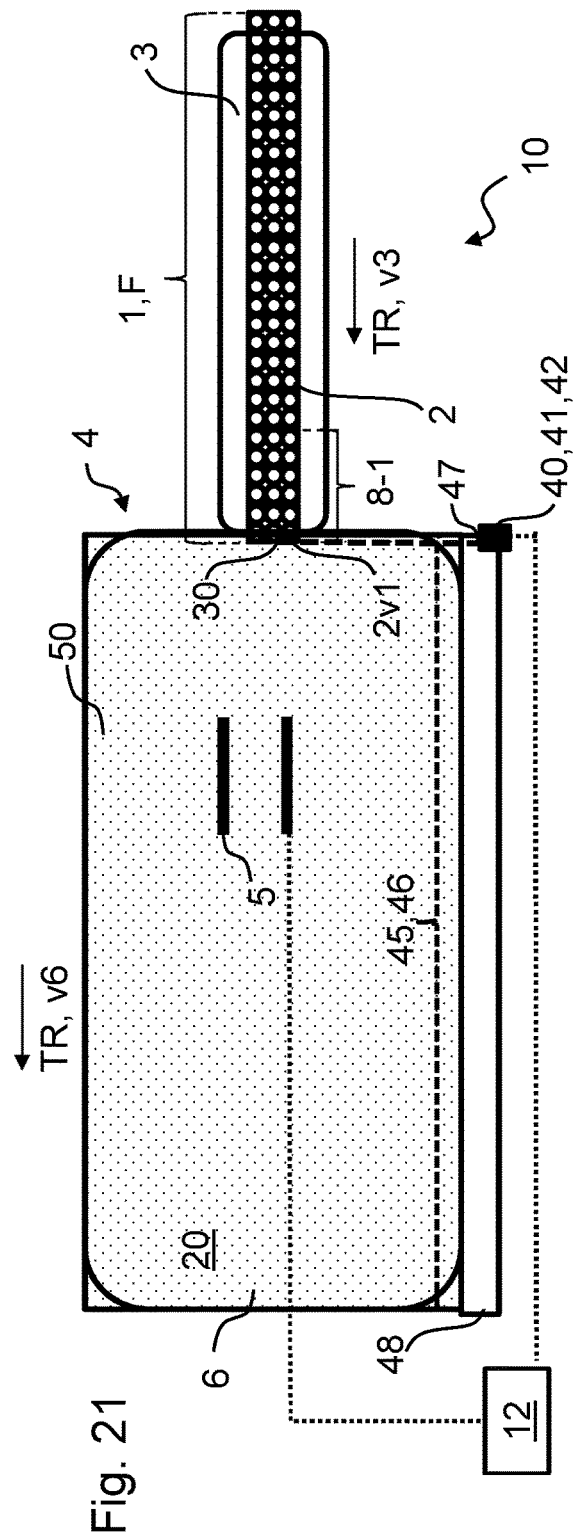
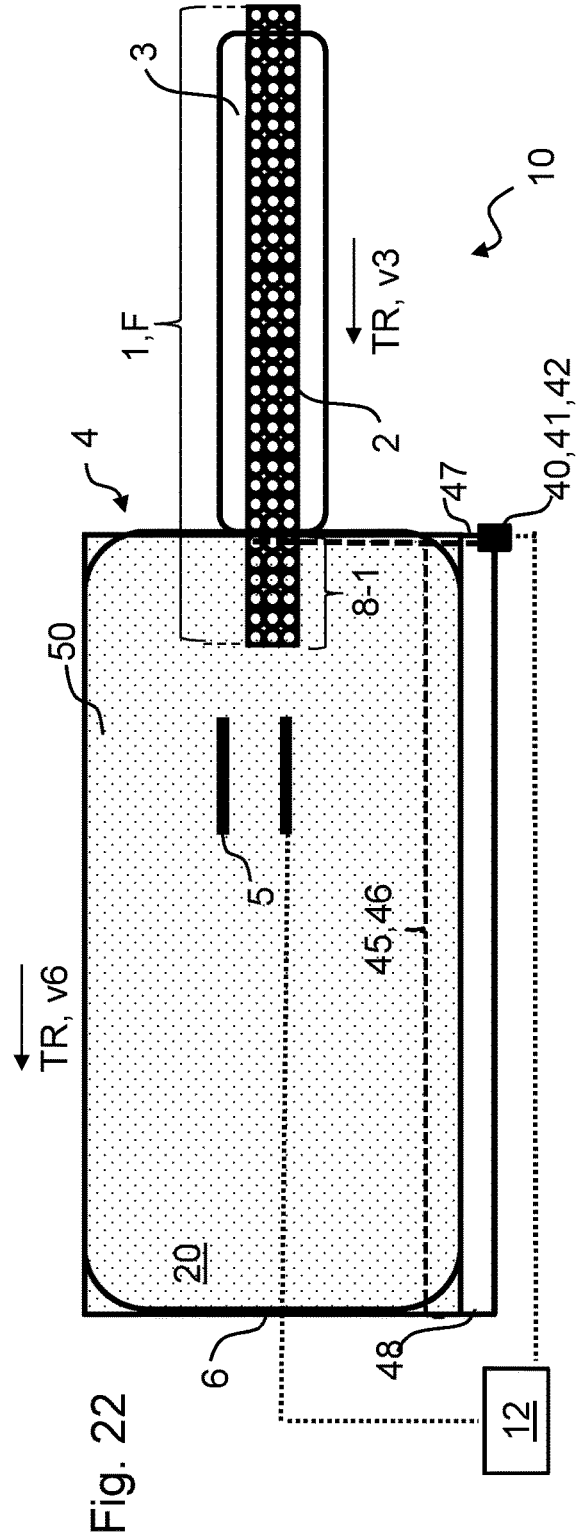
Fig. 21
Fig. 22

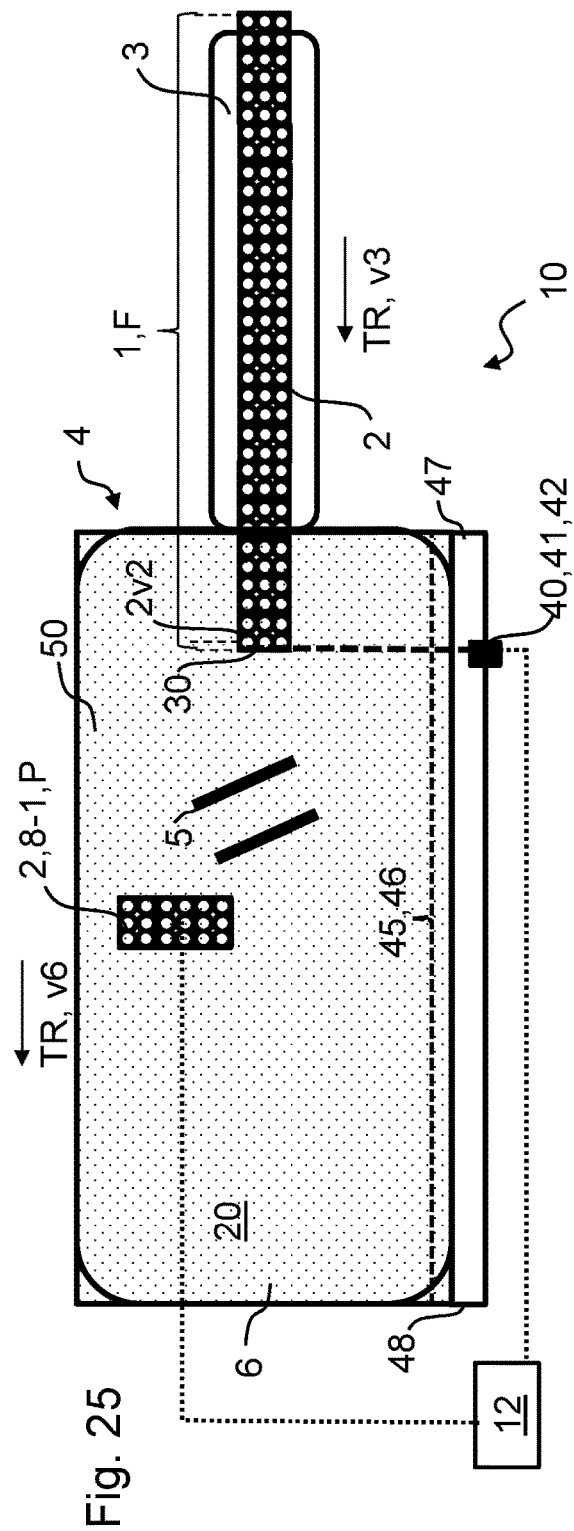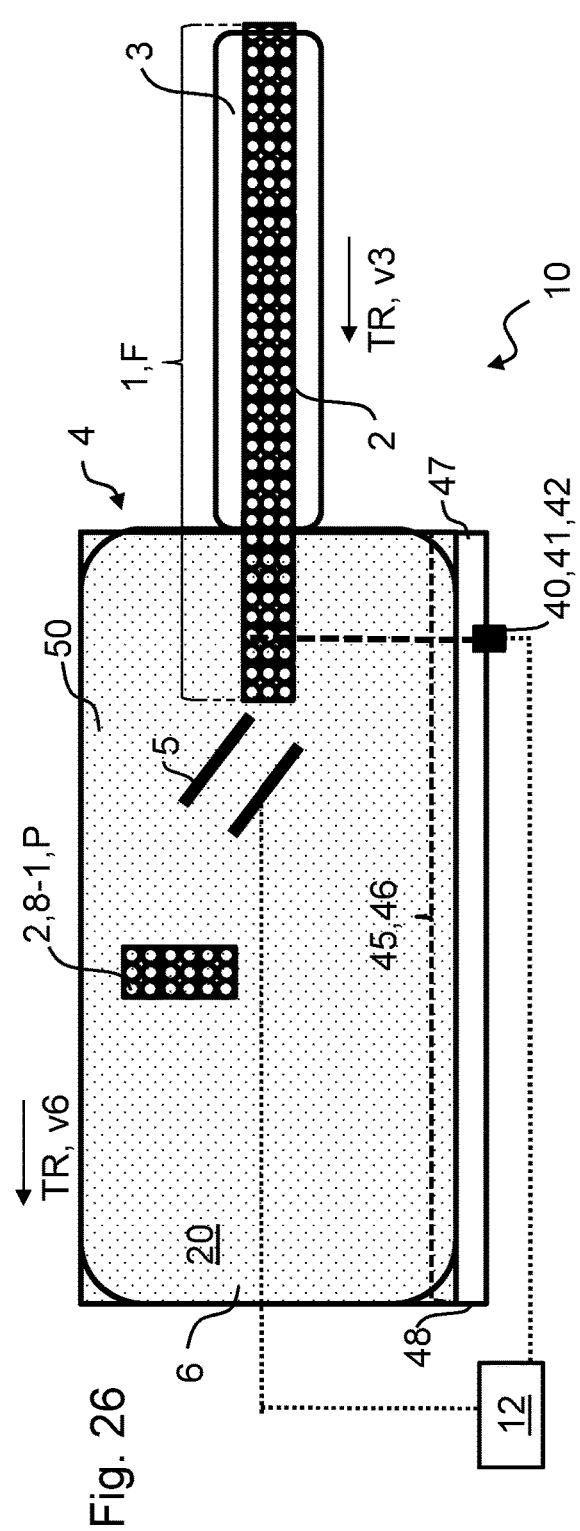

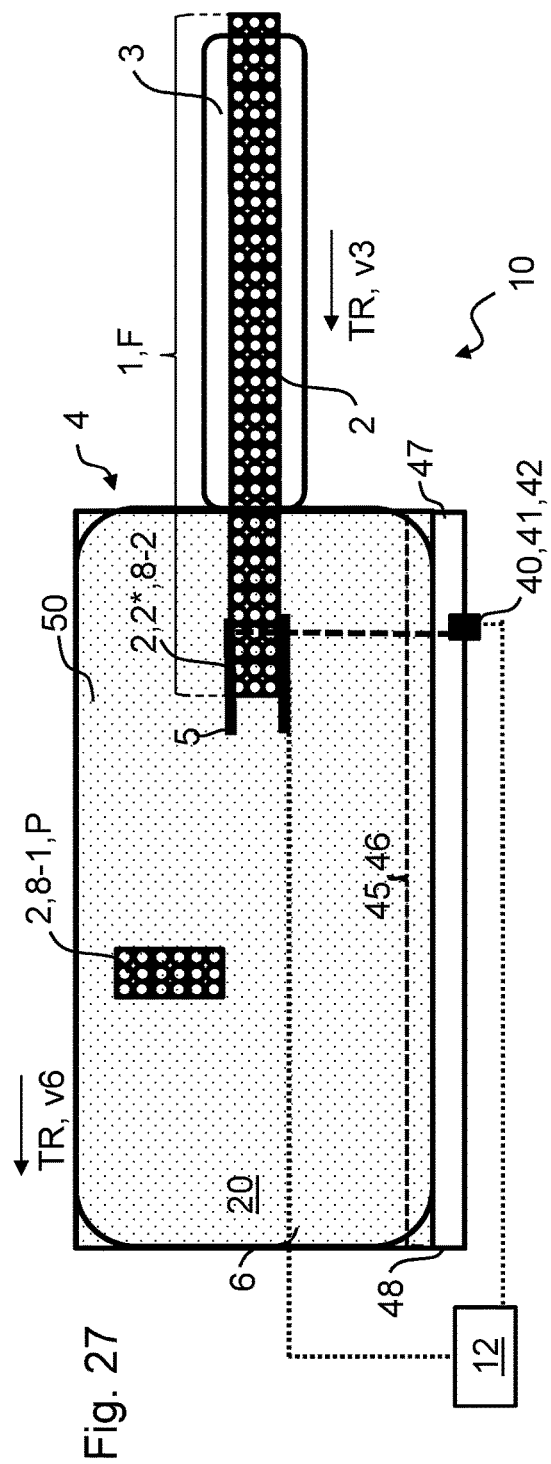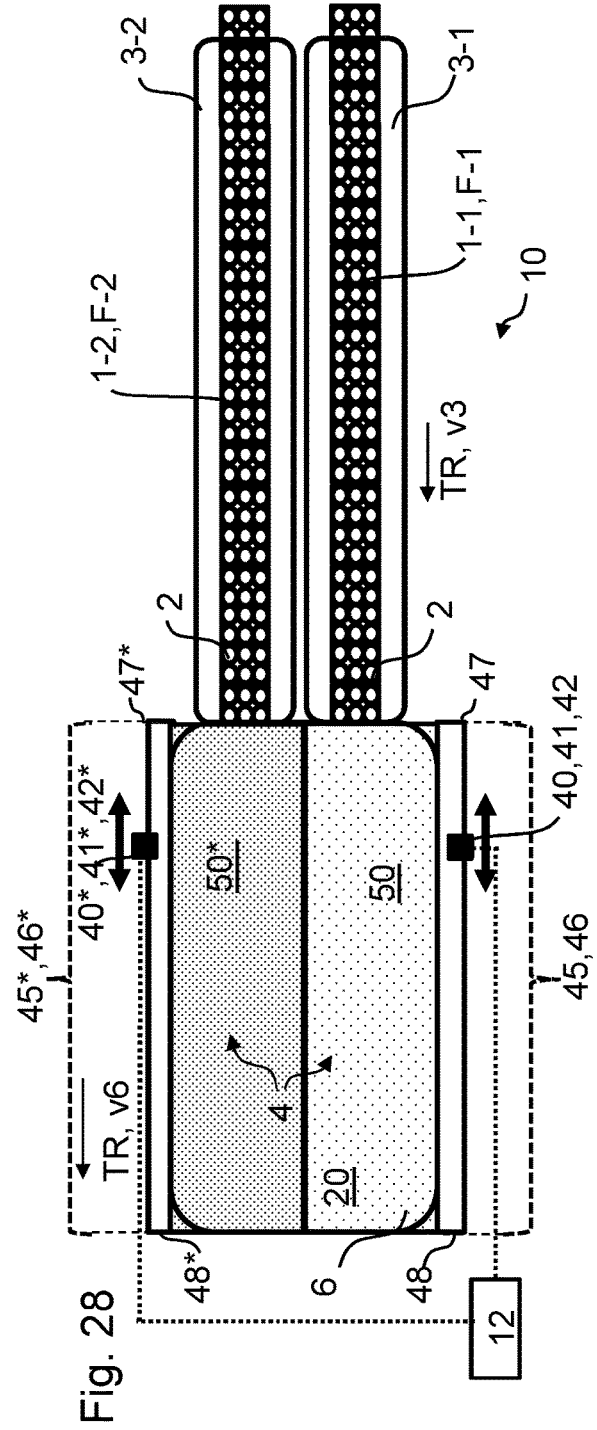

APPARATUS AND METHOD FOR HANDLING MOVING PIECE GOODS, AND A CONVEYING, PROCESSING AND/OR PACKAGING PLANT WITH AN APPARATUS FOR HANDLING MOVING PIECE GOODS

CLAIM OF PRIORITY

The present application claims priority to international application PCT/EP2017/053880, filed Feb. 21, 2017, which in turn claims priority to German application DE 10 2016 213 400.0, filed Jul. 21, 2016, which are incorporated by reference.

FIELD OF THE INVENTION

This invention concerns an apparatus and method for handling moving piece goods. In addition, the invention relates to a conveying, processing and/or packaging plant with an apparatus for handling moving piece goods.

BACKGROUND OF THE INVENTION

In the known methods for packaging and/or palletizing piece goods, such as packages, bundles, or the like, these are first conveyed on transport devices conveying in lines, and are shifted, aligned, and/or assembled in a suitable manner for producing desired layer patterns that can be subsequently stacked in multiple layers on top of each other, for example on pallets prepared for this purpose. These treatment steps can be particularly useful with facilities for treating beverage containers. The piece goods in question can be, for example, packages, crates, cartons, bundles, or other clusters. For the mentioned pallets to be safe for transport, the assembled layer patterns, which are also referred to as assembled cycles, have to meet certain requirements. In order to form such cycles, it is customarily necessary to perform preparatory procedures, which consist, for instance, in first conveying piece goods regularly or stepwise on a so-called dosing belt, in then grouping or gathering them on an intermediate transport belt, and in delivering them together and/or in groups from there to a layer-forming belt or a layer-forming table.

In the prior art it is known to deliver spaced-apart piece goods from a dosing belt onto a transport belt, which means that in each instance individual piece goods are delivered to the transport belt. This delivery can be carried out by each individual piece good being individually delivered onto the transport belt by way of a velocity difference between dosing belt and transport belt; a control by optical sensors, for example light barriers, can additionally be in place. It is likewise conceivable to convey the piece goods in a spaced-apart manner from the transport belt by way of operating the layer-forming belt in a stepwise manner. In order to deliver in each instance individual piece goods from the transport belt onto the layer-forming belt in such a manner, the layer-forming belt can be operated in steps that are synchronized with the transport belt by exactly one length of a piece good in transport direction. These cycles or groups or parts of grouped piece goods can also be rotated on the transport belt according to the desired layer pattern in order to then be delivered to the layer-forming belt.

Prior art knows different embodiment variants for designing grouping tables that serve to bring together piece goods, such as cartons, shrink packs, trays or plastic crates. Piece goods can be brought together by being assembled into a two-dimensional formation (block construction, e.g. pallet layer), for example. For this purpose, a roller conveyor, for instance, can be supplied linearly from one or several lanes. According to requirements, the piece goods can be rotated prior to or on the roller conveyor, and they can be arranged in each required position mechanically by stop points. The piece goods positioned in such a way can then be pushed off from the roller conveyor in a direction orthogonal to the transport direction. Supplying, arranging, and pushing off the piece goods can in this context be regarded as a cycle. At least one such cycle is needed to assemble one layer, normally, however, a plurality of such cycles are needed to generate a layer. The partly discontinuous conveyance with its relatively abrupt speed changes or direction changes causes accordingly high mechanical stress on the piece goods, which is possibly detrimental to product-protective processing of the piece goods.

Document EP 1 456 101 A2 discloses an apparatus for forming rows from packaging goods for bundle palletizers. The bundle palletizer comprises at least one layer generating station and at least one palletizing station. The row forming apparatus comprises at least one positioning station, on which the packaging goods are arranged at desired spaces in at least one row during the transport. The positioning station connects to a staging conveyor associated with the layer generating station. At least one accumulating conveyor is disposed upstream from the positioning station, which has several conveyor sections arranged consecutively in transport direction with controllable and regulatable drives. The controllable and regulatable drives make it possible to achieve the desired spacing for the packaging goods. The row forming apparatus has at least one monitoring device for identifying and monitoring the spacing of the packaging goods. The construction of this known row forming apparatus is rather elaborate and complicated, especially as many belts are required for forming the spaces and/or for rotating the packaging goods.

An apparatus is known from U.S. Pat. No. 5,123,231 A for assembling articles into groups and subsequently packaging them. On a feeder belt and in each instance with predefined spaces, the articles are fed to a collection belt where the groups are assembled from an unvarying number of articles. The groups are then fed to a subsequent belt of a packaging device.

EP 1 927 559 A1 discloses a grouping table for bringing together bundles, in particular shrink packs, for the purpose of forming layers, the grouping table comprising a continuously drivable conveyor, disposed downstream therefrom and cyclically drivable a step conveyor, disposed laterally next thereto a layer-forming station, and a push-off device associated with the step conveyor and acting orthogonal to the conveying direction for the groupwise transfer of the bundles onto the layer-forming station.

US 2005/0246056 A1 discloses a system for arranging packaging items into a layer that is deposited or stacked on a pallet in following handling procedures. It involves three linearly arranged conveyor belts. Via a first conveyor belt, the packaging items are supplied to the apparatus. The packaging items are disposed linearly on the first conveyor belt. With the second conveyor belt, the packaging items are spaced apart. Subsequently, the packaging items reach a third conveyor belt, where the arrangement of the packaging items is carried out. All three conveyor belts run at different, however, in each instance constant speeds. When a layer is completely assembled, it is transferred onto the pallet.

Manipulators of this type or also robots associated with the layer-forming belts can be designed as multi-axis robots, for example, such as are known from DE 10 2009 026 220

A1, for instance, in the context of grouping articles or beverage containers. A frequently used variant of such manipulators are so-called gantry robots, which are often employed in a modular structure in packaging lines, in grouping units, or in palletizing stations. A conveyor belt extending horizontally in longitudinal direction of the conveying level, or a different endlessly circulating means, are types of frequently used transport means or conveying units, on which the objects and/or packages are disposed in predetermined or in randomly assumed positions. Such a module is known, for example, from DE 10 2009 043 970 A1. The gantry robots that are typically employed in such modules, as known, for instance, from DE 10 2010 020 847 A1, can be equipped with gripping apparatuses, for example, for lateral seizing of the piece goods to be handled or manipulated.

Optical monitoring devices which are used to control a handling robot for the seizing and positioning of piece goods in connection with their transport, positioning and/or stacking are known from WO 2014/110349 A1. However, a permanent control based on the optical detection of the piece goods is provided, which requires a high computing and control effort.

DE 602 00 953 T2 reveals a method and system for the automatic and continuous production of layers of sales units before palletizing. The layers are formed by robots, the exact positioning of which is determined by incremental encoders assigned to the conveyors used to transport the sales units. Such couplings by incremental encoders, however, entail the risk that inaccurate positioning of piece goods may result in deviations in the assignment. In addition, incorrect positioning of piece goods can add up, so that further measures may be necessary for exact movement control of the robots.

All these known handling systems primarily aim for precise positioning of piece goods, packages, bundles, and/or articles in order to ensure, as far as possible, a failure-free and reliable preparation for layer forming, palletizing, and/or packaging. A secondary object that is, however, becoming increasingly important, lies in reducing the cycle times in this process without reducing the already achieved degree of precision and without having to accept decreases in terms of the reliability already achieved.

In view of the known prior art an aim of the present invention is to enable processing and handling of piece goods, which are conveyed or transported in at least one row, with exact and precise positioning. The movement control of a manipulator for the seizing of piece goods shall be exactly adjustable to the position of the incoming piece goods, without requiring a lot of computing effort and/or control effort.

The method is moreover intended to run at high speed without creating disadvantages in terms of piece good positioning precision and/or piece good manipulation reliability. The corresponding device shall be capable of being operated quickly and with little computing effort and/or control effort for the movement control of a manipulator, all this with high reliability and consistently high positioning precision.

These objects of the invention are achieved by the subject matter of the independent claims, that is, by an apparatus for handling moving piece goods, a method for handling moving piece goods and by a conveying, processing and/or packaging plant comprising an apparatus for handling moving piece goods comprising the features of the independent claims. Features of advantageous further developments of the invention are indicated in the respective dependent claims.

SUMMARY OF THE INVENTION

The invention relates to an apparatus or handling apparatus and a method for handling moving piece goods, furthermore a conveying, processing and/or packaging plant for piece goods comprising an apparatus for handling moving piece goods. If therefore in some passages a method, a method variant, the method according to the invention or the like is referred to in the context of the present description, this is intended to generally mean the mentioned method for handling moving piece goods. This preferably concerns a method for handling piece goods moved one behind the other in at least one row. If, furthermore, in some passages an apparatus, a handling apparatus, an apparatus variant of the apparatus according to the invention or the like is referred to in the context of the present description, this is intended to generally mean the mentioned apparatus for handling moving piece goods, especially for handling piece goods moved one after another in at least one row. If handling of piece goods is referred to in the following description, in the descriptive passages relating to embodiments of the invention, in the claims and/or in connection with the entire disclosure comprising the figures and respective description, this is intended to comprise handling, seizing, positioning, moving in space, rotating, aligning, etc., in particular in the context of a manipulator and/or movable parts of the manipulator that are disposed in a seizing space or seizing range and that can move there within definable limits. The term of handling, however, likewise comprises positioning steps, conveying steps, and/or any types of handling steps that can take place in the context of conveying devices, horizontal conveying devices, transport belts, etc. that are part of the apparatus according to the invention and/or are in operative connection and/or in a transport connection therewith, be they parts that are arranged downstream or upstream in transport direction and/or conveying direction, or be they integrated parts of the apparatus according to the invention.

If an unchanged or new alignment of the piece goods after the seizing and/or handling is referred to in the context of the presently described apparatus and presently described method, this is intended to mean, in particular, the angular alignment of piece goods that are previously seized and moved and/or shifted and/or rotated by the manipulator. Seizing in the present context usually means gripping a piece good or gripping a plurality of piece goods simultaneously in a physical, form-locking and/or force-locking and/or clamping manner, as well as the handling thereof up to the point of reaching a target position and/or target alignment.

According to a preferred embodiment, the moving piece goods can be articles, packaging items, container assemblies, bundles, cartons, or the like moved one after another in at least one row. It can be provided, for example, that a plurality of articles of the same or of different kinds are gathered together in a bundle or in a mixed bundle by an external cardboard packaging, by a strapping tape or by a plurality of strapping tapes, by a film packaging, or the like. Furthermore, a plurality of beverage containers held together, for example, by a shrink wrap, by a strapping tape or a plurality of strapping tapes, can in each instance form one piece good for the purposes of this definition. In this context the piece goods moved one after another in at least one row can be designed to be the same or to be different, according to requirements of subsequent handling apparatuses.

The piece goods can be transported within the at least one row in different ways. In accordance with one embodiment of the invention, the piece goods within the row are transported via at least one transport device to a seizing range of at least one manipulator of the apparatus according to the invention, the piece goods within one row being spaced apart from each other and separated from each other by gaps. Alternatively, and/or additionally, groups of piece goods can also be fed into the seizing range of the at least one manipulator, whereby these groups can each comprise several piece goods within the row, in particular at least two piece goods which are at least largely adjacent to one another without gaps within the row. The groups can also be of different sizes; moreover, a group comprising two, three or four piece goods adjacent to each other without gaps can be followed by a single piece good etc. A further embodiment provides, that the piece goods are fed within the row without gaps or with minimum gaps as an uninterrupted or closed formation.

In this context, a closed formation is understood in particular as a series of piece goods transported one after the other in an endless formation, which has no interruptions or only minimal interruptions between the piece goods and can comprise any number of piece goods. In the closed formation, the piece goods can be transported in particular directly adjoining each other. This is caused, for example, by a back pressure applied once from behind. The back pressure is generated preferably before or shortly before the seizing range of the at least one manipulator of the handling apparatus. Alternatively, it can be provided that at least a slight back pressure acts permanently on the piece goods from behind. The closed formation shall be distinguished from an interrupted formation in which groups each containing a defined number of piece goods are fed in succession, each group comprising the same number of piece goods or a different number of piece goods and being separated from each other by gaps.

The apparatus for handling moving piece goods comprises at least one transport device for feeding the piece goods to a seizing range of at least one manipulator of the apparatus in the manner described above. The transport device, for example, is a horizontal conveyor, in particular a horizontal conveyor belt. From the transport device the piece goods are further conveyed to a horizontal conveying device, being in particular in alignment with the transport device, whereupon they are seized and in particular also released by the manipulator of the handling apparatus within the seizing range. The horizontal conveying device and the manipulator with its seizing range form in particular the grouping module of the handling apparatus.

According to an embodiment, the transport device and the horizontal conveying device can be formed by aligned conveyor belts. Alternatively, the terms transport device and horizontal conveying device can also be used for successive transport sections of a continuous conveyor belt.

Within the meaning of the present invention the seizing range defines in particular a movement range of the at least one manipulator of the apparatus according to the invention. The at least one manipulator is typically and/or preferably designed to seize and/or receive in each instance at least one piece good in a clamping and/or form-locking and/or force-locking manner, the piece goods being supplied in a row of piece goods transported one behind the other via at least one transport device into the seizing range of the manipulator. Furthermore, the manipulator is designed for separating and selectively transferring the at least one seized piece good into a target position and/or target alignment.

According to an embodiment, at least one manipulator can have at least two clamping elements and/or gripping elements arranged opposite each other, in particular in pairs opposite each other and adjustable against one another. The clamping elements and/or gripping elements cooperate with one another, in particular in pairs with one another, to seize the respective piece goods in a clamping and/or form-locking and/or force-locking manner as well as separating the seized piece goods and selectively transferring them in the target position and/or target alignment. During the seizing of the piece goods, the clamping elements and/or gripping elements of the manipulator are aligned parallel to the transport direction of the infeeding piece goods.

From the moving piece goods, in particular from the piece goods supplied singly, in groups or as a closed formation, at least one moving piece good is seized by the manipulator within the seizing range of the at least one manipulator in a clamping and/or form-locking and/or force-locking manner, then it is spatially separated from the subsequent piece goods and brought into a defined relative target position and/or target alignment with respect to the subsequent piece goods. This takes place in particular in a continuous process in which the supply of subsequent piece goods is continued and not interrupted. The piece goods are released by the at least two clamping elements and/or gripping elements arranged opposite one another after being brought into their respective defined target position. The clamping elements and/or gripping elements, which can be adjusted relative to each other, permit rapid seizing, displacement, positioning and release of the piece goods at the desired speed with the desired positioning precision. Other manipulators can also be used advantageously, e.g. those which are designed as multi-axis robots, as parts of such multi-axis robots, as parallel kinematic robots, as delta kinematic robots or so-called tripods or as manipulators forming part of a delta kinematic robot or a parallel kinematic robot.

Here at least space coordinates and/or position data and/or contour data of at least one piece good moved in the transport direction to the seizing range are detected by a sensor before the seizing of the at least one piece good by the manipulator. The data is made available as a position value to a control unit and/or analysis unit.

The sensor technology required for this is provided by at least one movable optical detection device which is spatially and/or functionally assigned to the seizing range and/or a movement space of the at least one manipulator. This optical detection device serves to detect the above-mentioned data, i.e. in particular at least the space coordinates and/or position data and/or contour data of a moving piece good or even only the actual position of the leading contour edge or contour position.

At least the manipulator and/or further conveyor components of the apparatus, for example the transport device via which the piece goods are fed into the seizing range or the horizontal conveying device assigned to the seizing range, etc., are calibrated and/or controlled on the basis of the determined space coordinates and/or position data and/or contour data. Furthermore, the determined data can also be used in feedback of the position of the movable optical detection device. For example, the acquisition of a space coordinate or of a corresponding position data and/or contour data can trigger an activation or deactivation of the optical detection device, or trigger the simultaneous movement of the optical detection device with the transport device and/or horizontal conveying device, or the like. As soon as deviations in the piece good dimensions and/or the conveying speed etc. are detected, this can be constantly corrected as described in more detail below, that is for all subsequent cycles or manipulation steps.

During gapless feeding of piece goods within a closed formation, process-related small gaps may occur between the piece goods on the transport device. If such gaps add up, there is a particular risk that the incoming piece goods will shift relative to the defined seizing position of the manipulator, so that the manipulator can no longer correctly seize the at least one piece good to be manipulated or the group of piece goods to be manipulated in each instance. This may lead to malfunctioning of the handling apparatus. When feeding individual piece goods and/or groups of piece goods with a defined distance from each other, errors may occur during the preceding method step of gap formation, the errors may cause not all gaps to have the correct size. In order to prevent the manipulator from incorrectly seizing the at least one piece good, the data determined by the sensor is used, for example, to constantly calibrate and align the manipulator during the ongoing process.

In accordance with a preferred embodiment of the present invention, the optical detection device may be moved at least temporarily parallel to the horizontal conveying device assigned to the seizing range. In particular, the optical detection device is designed to move approximately parallel to the transport direction of the piece goods on the infeeding transport device or on the horizontal conveying device. The movable optical detection device is movable in particular in a movement range parallel to the transport direction of the piece goods or groups comprising at least two piece goods on or parallel to a horizontal conveying device of the grouping module arranged within the seizing range of the manipulator. The movement range is limited by a starting point and an end point and thus defines the detection range of the optical detection device. In order to implement the movement of the optical detection device in the transport direction or opposite to the transport direction the optical detection device is arranged, for example, on a carriage or a trolley which can be moved along a rail, along a toothed belt drive or the like, the rail being arranged parallel to the piece goods moving within a row in alignment one behind the other and the rail being arranged next to or above the horizontal conveying device. In particular, the optical detection device can be moved within the movement range between the starting point and the end point.

According to an embodiment, the movement range or detection range of the optical detection device covers the entire seizing range of the manipulator. In particular, the optical detection device may be moved parallel to the entire length of the horizontal conveying device of the grouping module. According to another embodiment it is provided that the movement range or the detection range of the optical detection device only covers a partial length of the horizontal conveying device of the grouping module adjoining the transport device in the transport direction, while another alternative embodiment is also disclosed, in which the optical detection device has a movement range extending beyond the horizontal conveying device of the grouping module. The movement of the optical detection device is preferably not mechanically coupled to the movement of the manipulator. In particular, the optical detection device is assigned its own independent drive. According to one embodiment, the optical detection device is linearly movable, while the manipulator is movable within at least one plane of movement, preferably while the manipulator is movable within a three-dimensional space. As will be described in more detail below, an electronic coupling may be provided between the manipulator and the optical detection device via the control unit and/or analysis unit.

When in the context of position detection the movable optical detection device is mentioned, this optical detection device may, for example, be formed by a movably constructed and/or movably arranged light barrier, a movably constructed and/or movably arranged laser edge scanner or another movably constructed and/or movably arranged detection device, which optical detection device is suitable for detecting certain parameters of a piece good and/or certain parameters of a group of piece goods, in particular space coordinates and/or position data and/or contour data. When a movable light barrier is used, this preferably has an optical path that is aligned to be transverse to the transport direction of the piece goods and and approximately horizontal and/or parallel to a support plane and/or transport plane of the horizontal conveying device. An interruption of the optical path, for example, indicates that a piece good or a group of piece goods is now being transported into the seizing range of the manipulator or the grouping module.

The light barrier arrangement is preferably formed by a reflection light barrier for detecting light-dark contrasts within a definable distance range from a transmitter/receiver. This is particularly advantageous for the processing of piece goods moving in two rows in which an optical detection device is provided on both sides of the seizing range of the at least one manipulator. Each of the optical detection devices is set in such a way that it only ever detects piece goods of the respective assigned row. The at least one manipulator picks up piece goods from one of the two rows according to a defined scheme in order to arrange and/or align them in accordance with a layer scheme to be formed.

If instead of a light barrier a so-called edge scanner is used, which provides the control unit and/or analysis unit with space coordinates and/or position data and/or contour data, even more detailed position data can be obtained, e.g. an inclined position and/or other incorrect positioning of one of the piece goods which can be corrected, if necessary, during seizing by the manipulator. For example, an edge scanner of this type is used to obtain space coordinates and/or position data and/or contour data for the in each instance foremost located piece good and/or for a contour edge facing forward or backward relative to the transport direction.

In accordance with a further embodiment, at least one camera with downstream image evaluation is used as optical detection device, from the data of which the control unit and/or analysis unit obtains space coordinates and/or position values and/or contour values for a moving piece good, in particular space coordinates and/or position values and/or contour values for the in each instance foremost located piece good and/or for the piece good's contour edge facing forward or backward.

The listed optical detection devices or sensor devices are to be understood by way of examples. In principle, however, other sensor variants can also be used, e.g. ultrasonic sensors or similar. Other suitable sensors can also be used advantageously by a person skilled in the art.

The manipulator is furthermore coupled to a control unit and/or analysis unit already mentioned above. For example, the control unit and/or analysis unit of the handling apparatus generally controls the movement of the manipulator and/or other machine components of the apparatus. Preferably, the control unit and/or analysis unit contains stored information on a grouping formed from a plurality of piece goods in order to generate a palletizable layer, wherein the respective target positions and/or target alignments of the piece goods form part of the information and assign a respective specific position and/or relative orientation to the respective piece goods within the respective grouping.

The data determined by the sensor is transmitted to the control unit and/or analysis unit and the at least one manipulator and/or the movement control of the at least one manipulator is/are calibrated on the basis of the coordinate values and/or position values supplied by the control unit and/or analysis unit at least during the seizing of at least one moving piece good, for example during the seizing of at least one foremost located piece good, and the spatial separation of the at least one piece good from the subsequent piece goods. For example, the calibration is done using coordinate values and/or position values for the piece goods located in each instance at the foremost position and/or their contour edges facing forward or backward.

The data determined by the sensor is especially used to calculate a sequence of movements for the manipulator by the control unit and/or analysis unit, and/or if necessary to adapt and/or correct the movement sequence. The calculated values are preferably used for selective control, activation and/or movement of the clamping elements or gripping elements of the manipulator by the control unit and/or analysis unit of the handling apparatus.

The control unit and/or analysis unit may in particular be an electronic and/or programmable control unit and/or analysis unit, such as a PLC. In this control unit and/or analysis unit different recipes/data can be stored, with each of which different piece goods—for example, six-packs and four-packs—can be clamped, released and/or realized. The control unit and/or analysis unit may in particular contain the following recipes/data:

different target positions and/or target alignments, in particular whether the piece goods reach the target positions and/or target alignments with rotation or without rotation, and/or information on the targeted layer scheme, i.e. arrangement of piece goods relative to each other in the respective target position, and/or number of formations in the infeed of the apparatus, in particular single-row or multi-row infeed of piece goods etc.

With certain adaptations, a pre-described apparatus can also be used for multi-lane infeed, in particular three-lane infeed or four-lane infeed. The sensor(s) for detecting the piece goods in the middle row(s) must be arranged in such a way that they are not within the seizing range of the manipulator and thus do not disturb it. On the other hand, however, the sensor(s) must be positioned and oriented in such a way that the sensor(s) can reliably detect the piece goods of the corresponding middle row(s) and, at the same time, not detect piece goods of adjacent (outer) rows.

In particular, in the case of a triple-row infeed, a sensor for the middle row is arranged above an existing sensor on one side of the grouping module so that it can move parallel to the horizontal conveying device. The sensor for the middle row is oriented in such a way that it detects the incoming piece goods of the middle row at an oblique angle and, for example, recognizes the front edge of the foremost incoming piece good of the middle row.

In the case of a quadruple-row infeed, one sensor for each of the two middle rows is arranged above an existing sensor on each side of the grouping module, so that they can move parallel to the horizontal conveying device. In particular, for example, the sensor located to the right of the horizontal conveying device in the transport direction recognises the left row of the two middle rows and the sensor located to the left of the horizontal conveyor in the transport direction recognizes the right row of the two middle rows. Also, in this case care must be taken to ensure that the detection ranges of the sensors are clearly separated from each other and that each sensor only detects the piece goods within one row.

The apparatus may include, alternatively or in addition to the characteristics described above, one or more characteristics and/or properties of the method and of the different method variants described in detail below. The method may also alternatively or additionally have one or more features and/or characteristics of the described apparatus.

In the method according to the invention, moving piece goods are detected in a seizing range of at least one manipulator, spatially separated from subsequent piece goods and brought into a defined relative target position and/or target alignment, wherein at least space coordinates and/or a position of at least one of the piece goods moved in the transport direction to the seizing range is sensor-detected by at least one optical detection device, the optical detection device being spatially and/or functionally assigned to the seizing range and movably constructed, and the data is being made available to a control unit and/or analysis unit as a position value and wherein at least the manipulator and/or further associated conveyor components is/are calibrated and/or controlled on the basis of the space coordinates and/or position data and/or contour data. Preferentially it is provided that the optical detection device of the apparatus according to the invention is movable at least temporarily approximately in synchronism with a support plane and/or transport plane of the horizontal conveying device assigned to the seizing range, especially approximately parallel to a transport direction of the piece goods on the transport device and/or horizontal conveying device.

Preferably a movement control of the at least one manipulator takes place within the seizing range to seize at least one piece good, in particular to seize at least one foremost disposed piece good or at least one foremost disposed piece good of a subsequent manipulation step or of at least one of the subsequent manipulation steps, and to spatially separate the piece good from the subsequent piece goods based on the coordinate values and/or position values provided by the control unit and/or analysis unit for a piece good that is in each instance located foremost in the seizing range or entering foremost into the seizing range and/or for the piece good's contour edge that faces forward or backward relative to the transport direction.

Preferentially the movement control of the at least one manipulator is calibrated during each phase of seizing and receiving at least one piece good or at least one foremost located piece good of a subsequent manipulation step or of at least one of the subsequent manipulation steps based on the coordinate values and/or position values provided by the control unit and/or analysis unit for the in each instance foremost located piece good and/or for the piece good's forward-facing contour edge. This is possible, for example, as part of a real-time correction, that is the position of the manipulator is calculated and adjusted in each instance based on the coordinate values and/or position values of the foremost located piece good that is to be seized or at least one foremost located piece good of a preceding manipulation step or at least one of the preceding manipulation steps.

If piece goods arriving further back are to be gripped, so that by moving the gripped piece goods in alignment with the transport direction, these and all piece goods located in front of them are moved together, the position of the foremost located piece good can also be used for real-time correction of the position of the manipulator, even if this is not gripped by the manipulator. The grabbing of trailing piece goods within a closed formation can particularly be used to separate bigger groups of piece goods from the closed formation in just one method step.

According to an alternative embodiment, the determined data is not used directly during seizing of the piece goods for the correction in the subsequent method step, but only in a subsequent method step. This may be necessary if the control unit and/or analysis unit has already calculated the movement profile of the manipulator for the directly following method step.

Preferably it is intended to detect permanently and/or in cyclic sequence and/or in irregular sequence the respective space coordinates and/or positions of the piece goods transported into the seizing range, which are foremost located in the direction of transport, and/or the respective space coordinates and/or positions of the contour edges of the piece goods transported to the seizing range, and to make them available to the control unit and/or analysis unit as position values.

According to an embodiment, the optical detection device detects a piece good entering the seizing range of the manipulator or a piece good already within the seizing range of the manipulator and/or the piece good's contour edge facing forwards in the direction of transport, in particular the front edge of the foremost located piece good and follows the position of the detected contour edge in the direction of transport at least as long as until this piece good and, if applicable, at least one further piece good is/are seized by the manipulator and separated from the subsequent piece goods.

The movable optical detection device detects at least one defined or definable parameter of the foremost located piece good of the foremost group entering the seizing range. For example, the sensor detects a forward-facing contour edge of the foremost located piece good or one of the subsequent piece goods at the starting point of its movement range and thus when the foremost located piece good enters the detection range of the optical detection device or the sensor. Now the optical detection device is guided along in the transport direction parallel to the foremost piece good detected by the optical detection device, for example, via the running rail, until the leading piece good has reached the end point of the movement range and leaves the detection range of the optical detection device.

The optical detection device can then be returned to the starting point of its movement range by a movement opposite to the transport direction until the optical detection device detects the respective parameter of the next foremost located piece good. It can now be provided that the optical detection device is guided in the direction of transport via the running rail parallel to the detected foremost located piece good until this leading piece good has reached the end point of the movement range and leaves the detection range of the sensor, etc., or until the leading piece good and, if applicable, any further adjacent piece goods is/are seized by the manipulator.

The respective position of the optical detection device can preferably be transmitted to a control device, in particular, the respective position of the optical detection device after having detected the front edge or a rear edge of a moving piece good within the detection region in the transport direction, in particular a piece good located first in the transport direction of a respective group of foremost located piece goods, and the optical detection device being carried along with the detected piece good within the movement range. The values are used, in particular, to control at least one manipulator of the grouping module, so that it can detect and manipulate the group of piece goods arranged first within the grouping module according to the layer or partial layer to be formed.

The manipulator is calibrated, in particular, by the data recorded in the current conveying phase or on the basis of the coordinate values and/or position values provided by the control unit and/or analysis unit for a piece good seized in a preceding conveying phase and/or a preceding manipulation step by the manipulator and/or for the piece good's forward-facing contour edge.

After at least the foremost located piece good or a group comprising the foremost located piece good and at least one further piece good in direct contact with the foremost piece good has been seized by the manipulator and separated from the subsequent piece goods of the at least one row, the optical detection device is returned by a movement opposite to the transport direction. The optical detection device is moved opposite to the transport direction until it detects the next forward-facing contour edge of the subsequent piece good which is now the foremost located piece good. As soon as the optical detection device detects the now foremost located piece good, the movement opposite to the transport direction ends and the optical detection device once again moves along approximately in synchrony with the piece goods and the support plane and/or transport plane of the horizontal conveying device assigned to the seizing range. That means that the optical detection device follows the position of the foremost located piece good's contour edge facing forward in transport direction for at least as long until the piece good is seized by the manipulator and separated from the subsequent piece goods of the row either alone or as a group, the group further comprising at least one trailing piece good of the row of subsequently following piece goods.

According to a preferred embodiment, the optical detection device used for the calibration process is formed by at least one light barrier arrangement with an optical path that is aligned to be transverse to the transport direction and approximately horizontal and/or parallel to a support plane and/or transport plane of the horizontal conveying device for the piece goods. As soon as the foremost infeeding piece good enters the optical path, a signal is transmitted to the control unit and/or analysis unit whereupon a movement of the optical detection device is triggered. Preferably, the optical detection device moves along parallel to the incoming piece goods. In particular, the optical detection device moves along together with the foremost located piece good until the foremost located piece good is seized by the manipulator and separated from the subsequent piece goods.

According to an alternative embodiment the optical detection device remains stationary for a specified period of time after detecting a contour edge of at least one moving piece good, especially after detecting one forward-facing contour edge of the foremost located piece good or of at least one foremost disposed piece good of a subsequent manipulation step or of at least one of the following manipulation steps and is subsequently guided along in synchrony with the horizontal conveying device. While the optical detection device remains stationary, the piece goods on the transport device and/or the horizontal conveying device are continuously moved further along.

For example, it is provided that the optical detection device remains stationary for a defined time unit required by the transport device or horizontal conveying device to partially or at least largely further transport the piece good to be seized or the group of piece goods to be seized so that the optical detection device is now located in an area between the center of the piece good to be seized and its rear-facing edge or that the optical detection device is now located between the forward-facing edge and the rear-facing edge of a piece good following in transport direction, the piece good being part of a group of at least two piece goods to be seized. The defined time unit is calculated for example by the control unit and/or analysis unit based on the transport speed of the transport device or the conveying speed of the horizontal conveying device. With this variation of the method, it is particularly important that the optical detection device does not remain stationary for such a long time that it is already parallel to the piece goods to be seized later.

While the optical detection device remains stationary, it is also in an inactive state, this means that no signals are detected and/or no data is generated. After the defined time unit, a movement of the optical detection device is triggered synchronously to the transport device and/or horizontal conveying device, so that the optical detection device moves along synchronously with the piece good to be seized or the group of at least two piece goods to seized.

After seizing and spatially separating at least one piece good or a group of piece goods by the manipulator, the optical detection device gets a signal from the manipulator via the control unit and/or analysis unit. On the one hand this causes a movement of the optical detection device in a direction opposite to the transport direction of the piece goods on the transport device and/or horizontal conveying device and on the other hand it causes an activation of the optical detection device which is now capable of detecting space coordinates and/or position data and/or contour data. The optical detection device is being moved opposite to the transport direction for as long as until it detects a contour edge of a subsequent piece good, in particular until it detects a forward-facing contour edge of a subsequent piece good. The signal generated in this way in turn causes the detection device to remain temporarily stationary in combination with the inactivation, etc.

If the optical detection device is already located parallel to not seized subsequent piece goods before/during activation of the optical detection device and before/during movement in the opposite direction is to be triggered—for example because the optical detection device has remained stationary for too long —, this is detected by the signal that is provided by the optical detection device because of the presence of the piece good in the part of the detection range currently covered by the optical detection device. In this case it may be provided that the optical detection device is moved, for example, in the transport direction at a higher speed than the transport device and/or the horizontal conveying device, in order to bring the optical detection device in the transport direction in front of the moving piece goods. A detection of the respective coordinates, position data and/or contour data can now be affected by a subsequent movement in the opposite direction. A pendulum movement of the optical detection device in the transport direction and opposite to the transport direction can also be provided, with which the optical detection device searches for the now foremost moving piece good.

In accordance with a further embodiment, the movement control of the at least one manipulator is effected in the seizing range to seize at least one moving piece good, in particular a foremost disposed piece good, or at least one moving piece good of a subsequent manipulation step or of at least one of the subsequent manipulation steps and to spatially separate the piece good from the subsequent piece goods on the basis of the coordinate values and/or position values provided by the control unit and/or analysis unit for in each instance one moving piece good and/or its contour edge facing rearwards in the transport direction. In this context the use of an edge scanner as an optical detection device is particularly advantageous.

In all the embodiments described here, it is provided that the optical detection device is moved at least temporarily in approximately synchronism with a support plane and/or transport plane of a horizontal conveying device assigned to the seizing range and furthermore the optical detection device is moved at least temporarily opposite to the transport direction of the piece goods on the support plane and/or transport plane.

In the method variants described herein, individually spaced-apart piece goods and/or groups comprising two or more piece goods and/or spaced-apart, equally or differently sized groups, each with the same or different number of piece goods, or groups of piece goods arranged in closed formation and/or groups of piece goods arranged in interrupted formation with the same or different sized gaps between consecutive piece goods and/or between consecutive groups of piece goods are preferably transported to the seizing range of the manipulator in at least one row one behind the other, where they are sensed by the optical detection device and the corresponding signals are being processed for the particular calibration of the manipulator to the particular positions of the piece goods to be seized in the same manipulation step, in a subsequent manipulation step, or at least in one of the subsequent manipulation steps.

The method variants described are carried out in particular by the inventive apparatus described above.

The main purpose of this invention is the constant and/or cyclical or irregular recurring calibration of a manipulator of an apparatus or handling apparatus according to the invention as described above. The piece goods to be handled and to be positioned are transported in rows to the seizing range of the manipulator, whereby within the rows the piece goods are transported each individually spaced from one another and/or as groups of piece goods spaced from one another or immediately adjoining each other as a closed formation. The manipulator can simultaneously seize, for example, a maximum of two, three or more incoming piece goods. These piece goods, for example, can include 2×3 beverage containers or the like grouped together by an outer packaging.

The invention furthermore concerns a conveying, processing, and/or packaging plant for piece goods with an apparatus for handling moving piece goods as described above. Conveyor lines and/or manipulation stations for arranging the piece goods into configurations that are processable by the apparatus are arranged upstream of the described apparatus for handling moving piece goods and at least one palletizing station for arranging the piece goods that have been grouped and/or brought into layer arrangements by the apparatus is disposed downstream from the described apparatus.

The at least one movable optical detection device assigned to the seizing range and/or to a movement range of the at least one manipulator of the apparatus for handling moving piece goods, which optical detection device is prepared and equipped for obtaining space coordinates and/or position data and/or contour data of at least one piece good that is being moved in transport direction, has a discrete drive that is, in particular, independent of the transport device by way of which the moving piece goods are transportable to the seizing range of the at least one manipulator.

The movement of the optical detection device is preferably not mechanically coupled to the movement of the manipulator, but is independent of the movement of the manipulator. In particular, the optical detection device has a separate drive and is designed to be at least temporarily movable parallel to a horizontal conveying device that is assigned to the seizing range. However, an electronic coupling may be provided between the manipulator and the optical detection device, in which corresponding signals from the manipulator can trigger a movement of the optical detection device in the transport direction or opposite to the transport direction and/or an activation or deactivation of the optical detection device.

The space coordinates and/or position data and/or contour data determined by the optical detection device are used at least for calibrating and/or controlling the manipulator of the apparatus for handling moving piece goods and/or further conveyor components and/or plant components. The data can also be used, for example, to continuously recalibrate other machine components of the conveying, processing, and/or packaging plant, for example conveying devices upstream or downstream of the apparatus, the palletizing station downstream of the apparatus, etc., in order to ensure a trouble-free operation of the plant.

A particular advantage of the apparatus according to the invention, the method according to the invention and the conveying, processing and/or packaging plant according to the invention lies in the fact that the optical detection device delivers good, reliable values that can be used to adapt the movement of the manipulator and/or further conveying components and/or plant components quickly, so that errors arising from adding up small unwanted gaps or incorrectly formed spaces between the incoming piece goods or groups of piece goods can be corrected directly.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged relative to other elements to facilitate an understanding of the invention.

FIGS. 1 to 9 schematically show a first embodiment of an automated position detection/calibration within a grouping module of a handling apparatus according to the invention.

FIGS. 10 to 13 schematically show a second embodiment of an automated position detection/calibration within a grouping module of a handling apparatus according to the invention.

FIGS. 14 to 20 schematically show a third embodiment of an automated position detection/calibration within a grouping module of a handling apparatus according to the invention.

FIGS. 21 to 27 schematically show a fourth embodiment of an automated position detection/calibration within a grouping module of a handling apparatus according to the invention.

FIG. 28 schematically shows a fifth embodiment of an automated position detection/calibration within a grouping module of a handling apparatus according to the invention.

FIG. 29 schematically shows a lateral representation of a sixth embodiment of an automated position detection/calibration within a grouping module of a handling apparatus according to the invention.

FIG. 30 shows a schematic representation from above of the sixth embodiment of an automated position detection/calibration within a grouping module of a handling apparatus according to the invention according to FIG. 29.

DETAILED DESCRIPTION OF THE INVENTION

Figure 7:
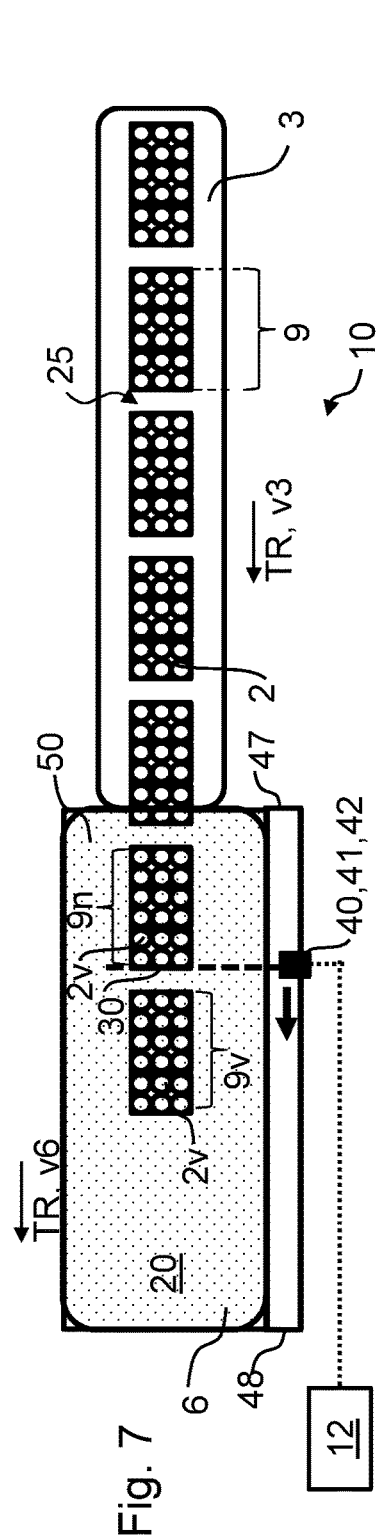

The same or equivalent elements of the invention are designated using identical reference characters. Furthermore, and for the sake of clarity, only the reference characters relevant for describing the individual figures are used. It should be understood that drawings of the detailed description and specific examples of the embodiments of the apparatus and of the method according to the invention are intended for purposes of illustration only and are not intended to limit the scope of the invention or of the inventive idea.

FIGS. 1 to 9 schematically show a first embodiment of an automated position detection/calibration within a grouping module 20 of a handling apparatus 10 according to the invention. Piece goods 2 are fed to the grouping module 20 in cycled groups 9 via a transport device 3. Piece goods 2 in terms of the described embodiment, in particular, are bundles consisting of six beverage containers, which are held together, for example, with a shrink packaging. One group 9 comprises three piece goods 2 each. Within the grouping module 20, a group 9 of piece goods 2 is each gripped and shifted, rotated or similar by a suitable manipulator (not shown), for example a gripper, in order to form a palletizable layer or a pre-grouping for a palletizable layer (not shown). The successive groups 9 arriving via the transport device 3 are separated from each other by defined gaps 25. The gaps 25, each preferably having the same size, are generated in a cycle formation module that is not displayed here. Deviations in the size of the gaps 25, i.e. deviations in the distances between the groups 9, can occur as a result of the process and/or due to deviations in the dimensions of the piece goods 2 and/or due to spaces between the piece goods 2 within a group 9; therefore it is advantageous to determine the exact position of the groups 9 directly in front of and/or within the grouping module 20 and to calibrate the manipulator (not shown) of the grouping module 20 on the basis of these measured values. On the basis of the measured position of the respectively measured group 9 in connection with known process parameters, for example the transport speed v3 of the groups 9 on the infeeding transport device 3 or the speed v6 of the groups 9 on a horizontal conveying device 6 of the grouping module 20, a calibration of the at least one manipulator (not shown) of the grouping module 20 is possible. This ensures that the group 9 of piece goods 2 to be manipulated can always be gripped correctly and shifted, rotated and/or otherwise manipulated accordingly.

Position detection is carried out with the aid of a movable sensor 40. This may, for example, be a movably constructed and/or arranged light barrier 41, a movably constructed and/or arranged laser edge scanner 42 or another suitable movably constructed and/or arranged optical detection device which is suitable for optically detecting certain parameters of a piece good 2 and/or certain parameters of a group 9 of piece goods 2. When a movable light barrier 41 is used, this preferably has a beam path aligned transversely to the transport direction TR of the piece goods 2 and approximately horizontally and/or parallel to the support plane and/or transport plane of the horizontal conveying device 6. An interruption of the beam path indicates, for example, that a piece good 2 or a group 9 of piece goods is entering the grouping module 20. If an edge scanner is used, further and/or more detailed position parameters and/or location parameters of the respectively detected piece goods 2 or the detected group 9 can be determined, e.g. incorrect positioning or the like, which can be compensated, if necessary, by the manipulator 5 seizing the piece goods 2.

The movable sensor 40 is particularly movable in a movement range 45 parallel to the transport direction TR of the piece goods 2 or groups 9 of at least two grouped piece goods 2 on or parallel to the horizontal conveying device 6 of the grouping module 20. The movement range 45 is limited by a starting point 47 and an end point 48 and thus defines the detection range 50 of the sensor 40. The sensor 40, for example, is arranged on a carriage which can be moved within the movement range 45 between the starting point 47 and the end point 48 via a running rail 46, a toothed belt drive or similar parallel to the transport direction TR of the piece goods 2 or groups 9. In particular, the sensor 40 is not mechanically coupled to the manipulator 5. Furthermore, the movability of the sensor 40 is not coupled to the movability of the manipulator. In particular, the sensor 40 has its own drive which can be used to move the sensor 40 preferably parallel to the transport direction TR of the incoming piece goods 2 or opposite to the transport direction TR of the incoming piece goods 2.

The movable sensor 40 detects at least one specific parameter of the foremost piece good 2 of the foremost group 9v entering the detection range 50 (see FIG. 2). For example, the sensor 40 detects a forward-facing edge 30 of the leading piece good 2v of the foremost group 9v at the starting point 47 of its movement range 45 and thus with the entry of the leading piece good 2v of the foremost group 9v into the detection range 50 of the sensor 40. Now the sensor 40—as shown in FIGS. 3 to 5—is guided along the running rail 46 in the transport direction TR parallel to the first foremost located group 9v with the leading piece good 2v which has been detected by the sensor 40 until the leading piece good 2v of the foremost group 9v has reached the end point 48 of the movement range 45 and leaves the detection range 50 of the sensor 40.

Alternatively, the sensor 40 is carried along in the transport direction TR parallel to the foremost group 9v with the detected leading piece good 2v via the running rail 46 until the foremost group 9v is seized by a manipulator (not shown) of the grouping module 20 and brought into a target position and/or target alignment (not shown). The target position and/or target alignment of the group 9v is located preferably outside of the detection range 50.

The sensor 40 is now returned opposite to the transport direction TR in the direction of the starting point 47 of its movement range 45—as shown in FIGS. 5 to 7—until the corresponding parameter of the next subsequent group 9n is detected by the sensor 40 (see FIG. 7), in particular the corresponding parameter of the leading piece good 2v of the subsequent group 9n.

Figure 8:
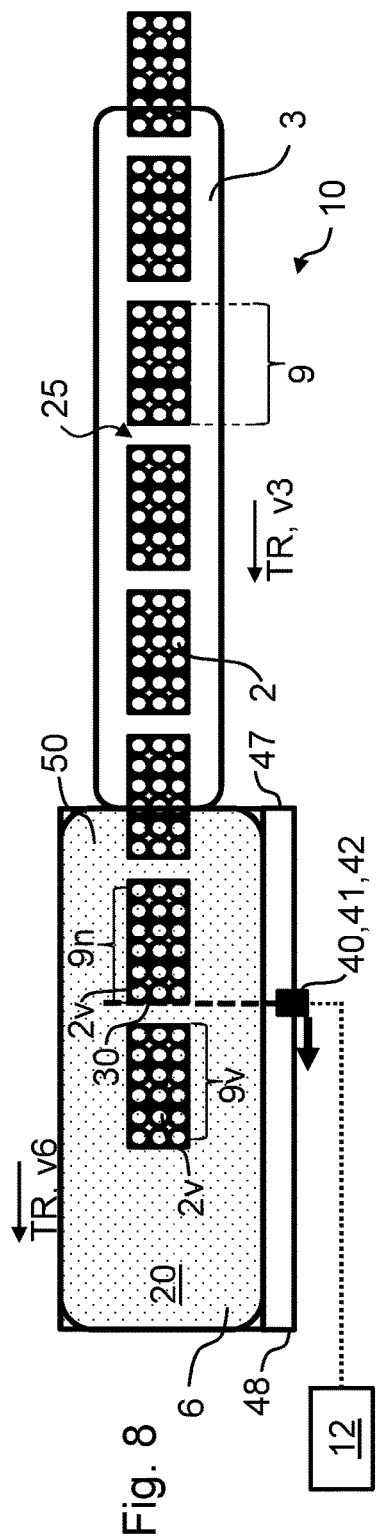
Figure 9:
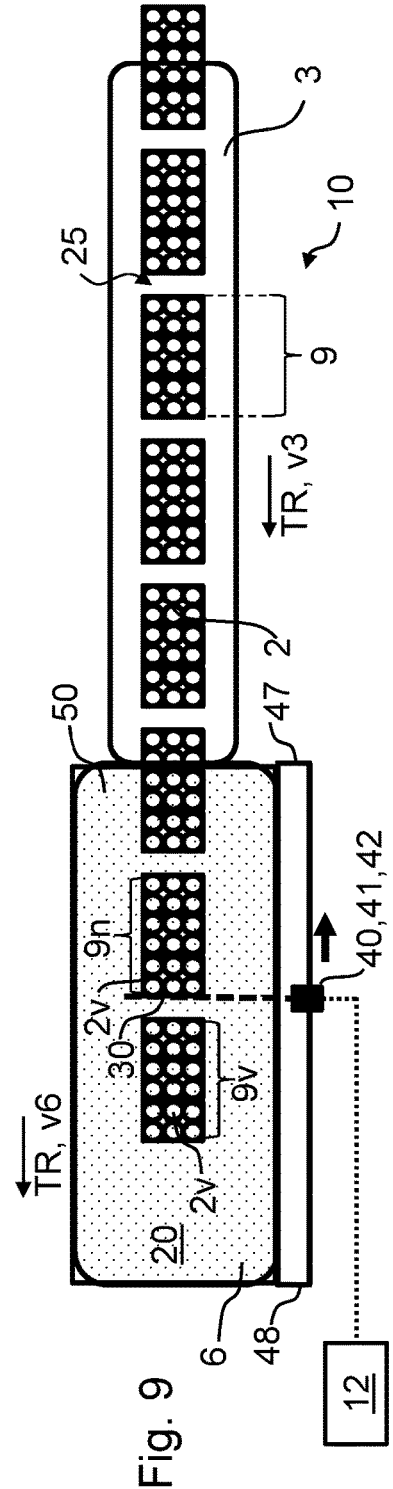

Now the sensor 40 is once again guided in the transport direction TR along the running rail 46 parallel to the group 9n with the detected leading piece good 2v of group 9n—as shown in FIGS. 7 to 9—until the leading piece good 2v of group 9n has reached the end point 48 of the movement range 45 and leaves the detection range 50 of the sensor 40 etc. or until the group 9n is seized by a manipulator (not shown).

The respective position of the sensor 40 is transmitted to a control device 12, in particular the respective position of the sensor 40 after it has detected the forward-facing edge 30 of a in transport direction TR foremost located piece good 2v of a respective foremost located group 9v, 9n of piece goods 2 within the detection range 50 in transport direction TR and is carried along with the group within the movement range 45. The values are used in particular to control the at least one manipulator (not shown) of the grouping module 20 so that it can seize and manipulate the group 9v, 9n of piece goods 2 arranged first and foremost within the grouping module 20 according to the layer or partial layer to be formed (not shown).

For the person skilled in the art it goes without saying that the position of the foremost incoming group 9v, 9n can also be measured before the grouping module 20 in the area of the transport device 3 or also in the transition area between the grouping module 20 and the transport device 3. In particular, the movement range 45 of the movable sensor 40 is arranged and/or designed accordingly.

According to an embodiment of the invention, the determined position of a group 9v is not used to calculate the correct positioning of the manipulator of the grouping module 20 for this group 9v. Instead, the positioning of the manipulator is adjusted for the next group 9 or a group 9 that follows later on. This may be necessary if the movement sequence of the manipulator for the respective group 9n to be seized has already been calculated by the control device 12 in order to make optimum use of the speed of the overall system and not to cause a delay in the grouping process by the sensory position detection.

The detection range 50 of the sensor 40 is essentially the same as the seizing range 4 of the manipulator (not shown) and the conveying surface formed by the horizontal conveying device 60 within the grouping module 20. In the terminal section of the horizontal conveying device 6 located in the transport direction TR, which for example adjoins directly to a layer centering module (not shown), first steps of a subsequent layer centering can be carried out, for example, within the grouping module 20, in particular within the detection range 50 of the sensor 40 and within the seizing range 4 of the manipulator.

In accordance with an alternative embodiment not shown here, it may be provided that the seizing range 4 of the manipulator and the movement range 45 or detection range 50 of the sensor 40 only cover a partial range of the conveying surface of the grouping module 20 formed by the horizontal conveying device 6 adjoining the transport device 3 in transport direction TR. In a subsequent section of the horizontal conveying device 6 which is located further downstream in transport direction TR, the first steps of a subsequent layer centering can be carried out, for example, within the grouping module 20. In another alternative embodiment not shown here, the sensor 40 may have a movement range 45 which extends beyond the horizontal conveying device 6 of the grouping module 20. In such a case, for example, the sensor 40 can at least partially move along a section of a layer centering module (not shown) located downstream in transport direction TR and, if necessary, record certain parameters of the layer to be centred in this section.

FIGS. 10 to 13 schematically show a second embodiment of an automated position detection/calibration within a grouping module 20 of a handling apparatus 10. The piece goods 2 are essentially fed as a gapless row 1 or formation F via the transport device 3. In the example shown, the piece goods 2 are bundles each consisting of six beverage containers, which are held together, for example, with shrink packaging.

The piece goods 2 are moved in the transport direction TR at a preferably constant transport speed v3 in the direction of a seizing range 4 of a movable, displaceable and/or rotatable manipulator 5 of the handling apparatus 10 and, in particular, are transferred without gaps from the transport device 3 to a horizontal conveying device 6 and are further moved thereon in the transport direction TR at a constant speed v6 which, in particular, corresponds to the transport speed v3 of the transport device 3.

The transport device 3 is, for example, a conveyor belt or another suitable conveying device on which the piece goods 2 are preferably transported in a single row, whereby there are no gaps or only minor gaps, possibly process-related, between piece goods 2 that are directly following each other. The piece goods 2 thus enter the seizing range 4 of the movable, displaceable and/or rotatable manipulator 5 in a so-called closed formation F.

Taken together the horizontal conveying device 6 and the at least one manipulator 5 arranged above the horizontal conveying device 6 are also referred to as the grouping module 20 of the handling apparatus 10. The piece goods 2 are especially transferred without gaps from the at least one transport device 3 to the grouping module 20 and are constantly moved further on within this grouping module 20 on the horizontal conveying device 6.

The manipulator 5 is designed for receiving piece goods 2 or groups of piece goods 2 in a clamping and/or form-locking and/or force-locking manner within the seizing range 4. The piece goods 2 seized by the manipulator 5 are referred to below with the reference characters 2* for the purpose of distinguishing them from the piece goods 2 of the formation F. The manipulator 5 grips, for example, in several temporally successive steps at least one, preferably at least two or three, piece goods 2, 2* arranged one after the other and arriving in closed formation F and at a constant transport speed v3, separates the piece good(s) from the single-row formation F of piece goods 2 and transfers the separated piece good 2* or the separated group comprising two or three piece goods 2* arranged without gaps in a row into a target position P and/or target alignment. It may be provided that the piece good 2* or the group of piece goods 2* is laterally displaced with respect to the infeeding formation F of piece goods 2 and/or that the seized piece good 2* or the seized group of piece goods 2* is distanced from the formation F of the piece goods 2 in the transport direction TR by the manipulator 5. In addition—as shown in FIGS. 12 and 13—the method in accordance with the invention may provide that the piece good 2* or the group of piece goods 2* is/are rotated relative to the piece goods 2 of the formation F.

During the positioning of the piece goods 2* seized by the manipulator 5, the at least one transport device 3 and the horizontal conveying device 6 are further operated continuously. In particular, the piece goods 2 of the formation F, as well as the piece goods 2* already arranged in the target position P, are further transported without interruption and/or at an unchanged transport speed v3 on the transport device 3 or at an unchanged speed v6 on the horizontal conveying device 6.

The manipulator 5 preferably has a certain handling capacity to seize several piece goods 2, 2*. However, it is provided that a certain number of piece goods 2 of the formation F are seized in each method step, in each instance matching the palletizable layer or pre-grouping of a palletizable layer to be formed. This is controlled and/or regulated in particular by a control device 12. The number of seized piece goods 2, 2* varies between one and the maximum number according to the handling capacity of the manipulator 5. Even if in the examples shown a maximum handling capacity of up to three piece goods 2, 2* per manipulator 5 is described, the considerations mentioned can also be applied analogously to manipulators 5 with a smaller or larger maximum handling capacity.

The position detection with the aid of a movable sensor 40 and the calibration of the manipulator 5 matched to it can also be used advantageously to guarantee an error-free process for the gapless supply of piece goods 2 to a grouping module 20 shown in FIGS. 10 to 13. The sensor 40 may be formed by a movably constructed and/or movably arranged light barrier 41, a movably constructed and/or movably arranged laser edge scanner 42 or any other suitable detection device analogous to the first embodiment described in FIGS. 1 to 9.

The movable sensor 40 is movable on the horizontal conveying device 6 of the grouping module 20 within a movement range 45 limited by a starting point 47 and an end point 48, parallel to the transport direction TR of the piece goods 2 that are supplied in a continuous row 1. Reference is made to the description of FIGS. 1 to 9 regarding the detection range 50 of the sensor 40, the movability of the sensor 40 and the control of the sensor 40 by the control device 12.

The movable sensor 40 detects a forward-facing edge 30 of the leading piece good 2v1 at the starting point 47 of its movement range 45, in particular when the first leading piece good 2v1 enters the detection range 50 of the sensor 40. Now the sensor 40—as shown in FIGS. 10 and 11—is guided in transport direction TR along the running rail 46 parallel to this foremost located piece good 2v1.

If the manipulator 5 now seizes the foremost located piece good 2v1 or a group comprising the foremost located piece good 2v1 and at least one immediately succeeding piece good 2, 2* and transfers it to a target position P (see FIG. 13) as described above, the sensor loses the detected forward-facing edge 30 of the foremost piece good 2v1. Due to the absence of a corresponding signal, the control device 12 triggers a movement of the sensor 40 opposite to the transport direction TR of the piece goods 2. The sensor 40 is then returned opposite to the transport direction TR in the direction of the starting point 47 of its movement range 45 until the sensor 40 detects the corresponding parameter of the now foremost located piece good 2v2 (see FIG. 12). As shown in FIG. 13, the sensor 40 is then again guided along the running rail 46 in transport direction TR parallel to the forward-facing edge 30 of the detected foremost piece good 2v2, until this piece good 2v2 is seized by the manipulator 5 and brought into a predefined target position and/or target alignment (not shown) according to a layer or partial layer to be formed, thereby leaving the detection range 50 of the sensor 40.

The respective position of the sensor 40 is transmitted to the control device 12, in particular the position when the sensor 40 is carried along within the movement range 45, parallel to a forward-facing edge 30 of the piece goods 2v1, 2v2 detected by the sensor 40. On the basis of the values, the exact position of the foremost located piece good 2v1, 2v2 is calculated at a defined time. Preferably, the position of the foremost located piece good 2v1 is calculated from the data for the time at which the manipulator 5 grabs the foremost located piece good 2v1, 2v2 and, if applicable, further immediately succeeding piece goods 2 of the formation F. The calculated position value of the foremost located piece good 2v1, 2v2 at this moment is compared with a positioning value for the manipulator 5 which has been determined by the control device 12 on the basis of a program that controls the movement sequence of the manipulator 5 for creating a partial layer or layer from piece goods 2. If there is a deviation between the position value of the foremost located piece good $2v1$, $2v2$ and the positioning value of the manipulator 5, the movement of the manipulator 5 is recalculated on the basis of the position value of the foremost located piece good $2v1$, $2v2$ and thus calibrated. In particular, subsequent movement sequences are also recalculated on the basis of the position value of the foremost located piece good $2v1$, $2v2$. Thus, the movement sequence of the manipulator 5 is continuously corrected. Thus, unwanted gaps between the piece goods 2 conveyed essentially without any gaps are considered in the movement sequence of the manipulator 5 in realtime so that the summing up of such gaps, which could lead to incorrect seizing of the piece goods 2 by the manipulator 5 especially in later method steps can be effectively prevented.

According to the embodiment shown in FIGS. 10 to 13 the detection range 50 of the sensor 40 and the seizing range 4 of the manipulator 5 essentially coincide with the conveying surface of the horizontal conveying device 6 of the grouping module 20. In particular, the sensor 40 can be moved parallel to the entire length of the horizontal conveying device 6 of the grouping module 20.

FIGS. 14 to 20 schematically show a third embodiment of an automated position detection/calibration within a grouping module 20. Analogous to FIGS. 1 to 9, it is not shown here how the incoming piece goods 2 are handled within the grouping module 20 in order to prepare a corresponding partial layer or total palletizing layer. For this purpose, reference is made in particular to the description of FIGS. 10 to 13.

In this embodiment (FIGS. 14 to 20), individually cycled piece goods 2 are fed to the grouping module 20 via a transport device 3, the piece goods, for example, comprising bundles of six beverage containers grouped together by a shrink packaging. The piece goods 2 consecutively transported in transport direction TR are spaced apart from each other by gaps 26. The gaps 26 may have been created beforehand in a not shown cycle formation module and preferably all have the same size L26. Since, however, deviations in the size L26 of the gaps 26 may occur due to the process and/or due to deviations in the dimensions of the piece goods 2, it is advantageous to determine the exact position of the piece goods 2 directly in front of and/or within the grouping module 20 and to calibrate the at least one manipulator (not shown) of the grouping module 20 based on these measured values in regular intervals or in irregular intervals. On the basis of the measured position of the foremost piece good $2v$ respectively detected by the sensor 40 in connection with known process parameters, for example the transport speed v3 of the piece goods 2 on the infeeding transport device 3 or the speed v6 of the piece goods 2 on a horizontal conveying device 6 of the grouping module 20, a calibration of the at least one manipulator (not shown) of the grouping module 20 is possible. This ensures that the respective piece good $2v$ which is preceding in transport direction TR and which is to be manipulated, can always be gripped correctly by suitable manipulators within the grouping module 20, e.g. grippers or similar, and can be shifted, turned and/or otherwise manipulated accordingly to form a palletizable layer or a pre-grouping for a palletizable layer.

Position detection and/or calibration is carried out with the aid of a movable sensor 40, as already described in detail in connection with the first and second embodiments. From the data transmitted from the sensor to the control device 12, the control device 12 can carry out a path evaluation in order to determine a length L1, L2 of the piece goods 2 and/or a length L26 of the gap 26. Length L1 corresponds to the length of a correctly positioned/aligned piece good 2. Length L2 corresponds to the length of a piece of goods $2f$ that has been tilted over. Further deviating lengths Ln (not shown) may occur if, for example, a piece good 2 is shifted diagonally. Length L26 corresponds to the length of the gap 26 formed between individual, correctly positioned piece goods 2. Length L26$k$ corresponds to the length of a shortened gap 26$k$, which, for example, has been reduced in size due to a piece good $2f$ that has tilted over (see FIG. 14). The determined actual length values are each compared by the control device 12 to defined nominal length values. If a discrepancy between the actual value and a nominal value for L1 or L26 is determined, this is an indication for a fallen over piece good 2 or a diagonally shifted piece good 2 or the like.

In the procedural steps described in FIGS. 14 to 20, the moving sensor 40 detects a forward-facing edge 30 of the foremost located piece good $2v$ at the starting point 47 of its movement range 45. Now the sensor 40—as shown in FIG. 15—is guided along the running rail 46 in transport direction TR parallel to the leading piece good $2v$. If the leading piece good $2v$ leaves the detection range 50 of the sensor 40, for example because of being seized by a manipulator or similar and being moved to a target position and/or target alignment, the sensor 40 is moved in the direction opposite to the transport direction TR until it detects the forward-facing edge 30 of the subsequent piece good $2f$. In the shown embodiment, this is a tilted over piece good $2f$ which can therefore be regarded as defective. Then again, the sensor 40 is guided along the running rail 46 in transport direction TR parallel to the forward-facing edge 30 of the detected piece good $2f$—as shown in FIG. 16—until this piece good $2f$ leaves the detection range 50 of the sensor 40, whereupon the sensor 40 detects the subsequent piece good $2n$ in the known manner (see FIGS. 17 and 18).

Thereby the distances which are covered by the sensor 40 in transport direction TR and in the opposite direction can be determined and/or calculated and thus the lengths L1, L2, . . . Ln of the respective piece goods 2 and/or the length L26 of the gap 26 between consecutive piece goods 2 can be determined.

If a discrepancy between the actual value and a nominal value for L1 or L26 is determined, further correction mechanisms may be provided. For example, a warning signal can be generated and/or a system stop can be triggered in order to allow corrective action to be taken. Alternatively—as shown in FIGS. 19 and 20—a correction device 52 or similar can be provided in addition to the at least one manipulator (not shown) of the grouping module 2, which removes the piece good $2f$ detected as being defective from the supply of cycled piece goods 2. For example, the correction device 52 may be formed by a gripper 53 which removes the defective piece good $2f$. Alternatively, the correction device 52 can be formed by a pusher 54 which pushes perpendicular to the transport direction TR, thereby removing the defective piece good $2f$ out of the row of cycled piece goods 2 arranged one behind the other in an alignment. Further correction devices 52 known to the person skilled in the art can be used and are also covered by the present invention. Since the removal of the defective piece good $2f$ results in an enlarged gap 26$v$ with an increased size L26$v$ relative to the directly following piece good $2n$ of the supply of subsequently following cycled piece goods 2, the manipulator of the grouping module 20 must be recalibrated accordingly. This is preferably done by the control device 12 based on the forward-facing edge 30 of the piece good 2*n* that is directly following the defective piece good 2*f* which has been detected by the sensor 40.

The described calibration system with the movable sensor 40 can be restarted without any problems after an error, a production stop which is due to other reasons or similar. If necessary, it can be advantageous during a restart, that the sensor 40 completely moves along its movement range 45 between the starting point and the end point 47, 48 at least once in the transport direction TR and/or in the opposite direction. Thus, if necessary, piece goods 2 still located within the detection range 50 can be detected and the necessary process parameters can be calculated accordingly based on these.

For all three embodiments described here, it is also conceivable that the piece goods 2 are transported to the seizing range 4 of the manipulator 5 in several rows, in particular in several parallel rows. Here, preferably one sensor 40 is provided per parallel row and it has to be ensured that the measured data are correctly assigned to the corresponding parallel rows. Furthermore, it is conceivable that the transport device 3 and the horizontal conveying device 6 represent different conveying sections of a continuous conveyor belt.

The further FIGS. 21 to 27 schematically show a fourth embodiment of an automated position detection/calibration within a grouping module 20 of a handling apparatus 10 according to the invention. Here the piece goods 2 are essentially supplied as a gapless row 1 or formation F via a transport device 3, analogous to the second embodiment shown in FIGS. 10 to 13. With regard to the transport device 3, the horizontal conveying device 6, the manipulator 5 and further components of the handling apparatus 10, reference is made to the description of FIGS. 1 to 20, in particular to the description of FIGS. 10 to 13.

Figure 23:
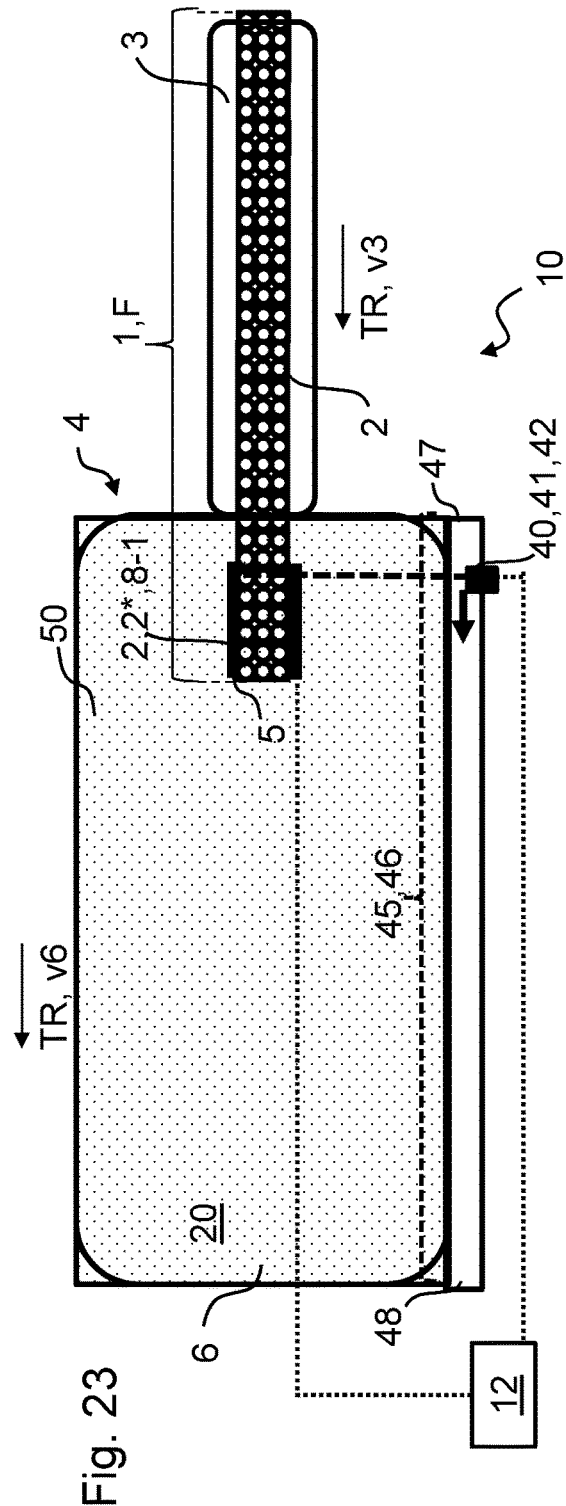
Figure 24:
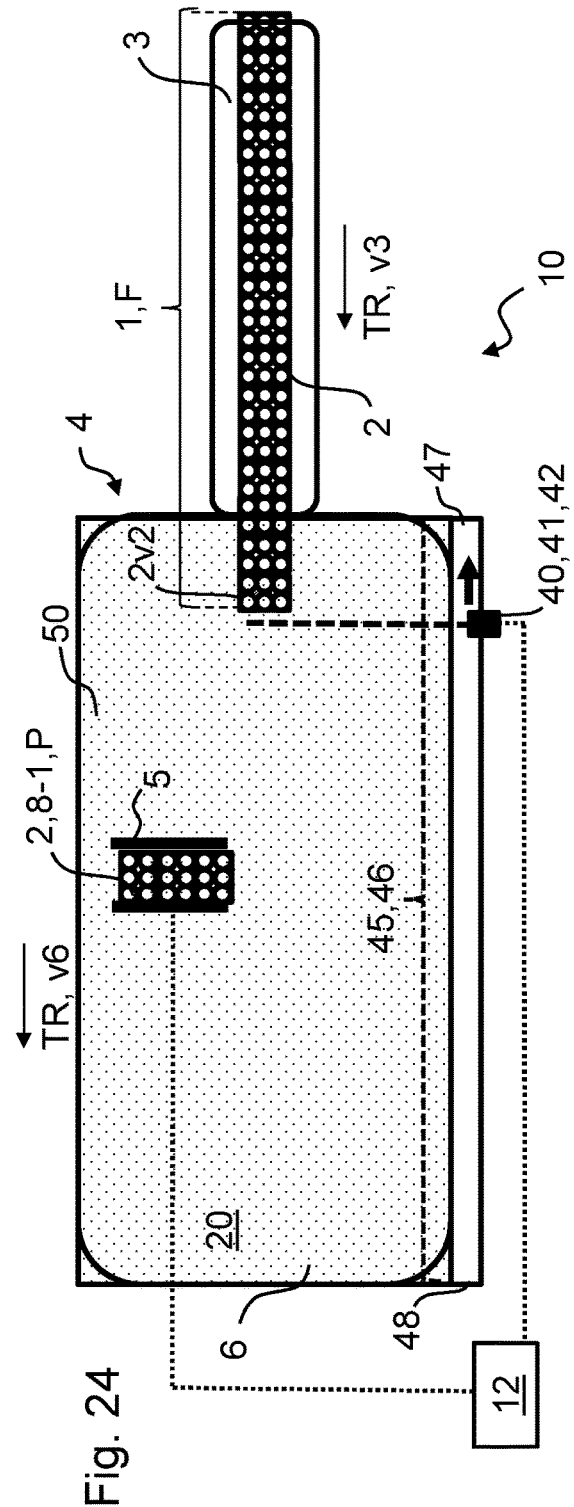

According to FIG. 21, the movable sensor 40 detects a forward-facing edge 30 of the foremost located piece good 2*v*1. While the piece goods 2 of the formation F further enter the seizing range 4 of the manipulator 5, the sensor remains stationary in its position according to FIG. 22 until the formation F has been further transported approximately along the length of a cycle to be seized. In this context, a cycle to be seized is understood in particular as a group 8-1 of piece goods 2 which are being seized simultaneously and thus in one working cycle by the manipulator 5 and which are being moved to a target position P and/or target alignment (see FIGS. 24 to 27). In particular, the group 8-1 in the shown embodiment comprises two piece goods 2. As shown in FIG. 23 the movement of the sensor 40 is enabled or activated immediately afterwards so that it moves in the transport direction TR via the running rail 46 in particular synchronously with and parallel to the moving piece goods 2 of the formation F, in particular moving in transport direction TR synchronously with and parallel to the moving piece goods 2 of the group 8-1 which is not yet separated from the formation F. At this phase of the process, the detection function of the sensor 40 is preferably inactive in order not to generate any interfering signals, and the movement of the sensor 40 takes place at the same speed as the speed of the horizontal conveying device 6. For example, the speed of the sensor 40 is electronically coupled to the speed v6 of the horizontal conveying device 6, so that the sensor 40 is synchronized to this speed v6. Here, it is also important that the sensor 40 does not start its synchronous movement too late within its travel movement; instead it has to be ensured that the sensor 40 is moved and travels synchronously with the piece goods 2 of the cycle to be seized, i.e. the piece goods 2 of group 8-1. The transport speed v3 of the transport device 3 supplying the piece goods 2 and the speed v6 of the horizontal conveying device 6 are each known. In particular, after detecting the forward-facing edge 30 of the piece good 2*v*1, the sensor 40 is held stationary as long as until the sensor is arranged in a section between the middle and a rear-facing edge of the cycle to be seized or of the group 8-1.

While the manipulator 5 now seizes the group 8-1 comprising the foremost located piece good 2*v*1 and two further piece goods 2, 2* and transfers it to a target position P as described above (see FIG. 24), the sensor 40 can optionally continue to be moved synchronously with the horizontal conveying device 6. Alternatively, it can be provided that the sensor 40 is not moved further during the seizing of group 8-1 by the manipulator 5.

After the manipulator 5 has seized the corresponding cycle of piece goods 2, 2* or group 8-1 and spatially separated it from the formation (see FIGS. 23 and 24), the detection function of the sensor 40 is activated so that it can produce corresponding sensor signals. For example, the control device 12 receives a corresponding "Shift Out" signal from the manipulator 5 and thereupon activates the sensor 40. The sensor 40 is now returned to the starting point 47 of its movement range 45 by a movement opposite to the transport direction TR of the piece good 2 (see FIG. 24) until the sensor 40 detects corresponding parameters of a now foremost located piece good 2*v*2 (see FIG. 25), in particular the forward-facing edge 30.

Now again the sensor 40 remains in this position until the formation F has been transported further by a length which is at least slightly shorter than the length of the next cycle to be seized by the manipulator 5 or of the next group 8-2 to be seized which comprises two piece goods 2 (see FIG. 27); then again it moves along synchronously until this next group 8-2 is seized by the manipulator 5 in the same way as described above, and so on.

The advantage of this embodiment is on the one hand that the sensor 40 has to cover shorter distances. This allows the system to be operated faster and more reliably. In addition, drives and further components of the system are being spared. This method is particularly advantageous if the speed v6 of the horizontal conveying device 6 is not constant, for example, because of the occurrence of statistical fluctuations.

If the sensor 40 before its activation is positioned in transport direction TR behind the forward-facing edge 30 of the now foremost located piece good 2*v*2, this can be detected and corrected in an embodiment of the method. This can be due to the fact, for example, that after its activation the sensor 40 immediately detects a piece good 2. In this case the control device 12 does not trigger a movement of the sensor 40 opposite to the transport direction TR but instead a movement of the sensor 40 in the transport direction TR is triggered. As soon as the sensor 40 detects that it is located in front of the row 1 of piece goods 2, the direction of movement of the sensor 40 is reversed again, so that it is moved opposite to the transport direction TR of the piece goods 2, in order to reliably detect the forward-facing edge 30 of the foremost located piece good 2*v*2. According to a further embodiment, the sensor 40 can be brought up to the piece goods to be seized by a kind of oscillating movement.

According to another (not shown) embodiment of the invention, the sensor can detect a trailing edge of the foremost piece good and position itself on this. The further procedural steps are essentially analogous to one of the embodiments described above.

The schematic top view of FIG. 28 shows a fifth embodiment of an automated position detection/calibration within a grouping module 20 of a handling apparatus 10 according to the invention. Here the supply of piece goods 2 is provided in two parallel rows 1-1, 1-2 or formations F-1, F-2. The feeding of piece goods 2 can be carried out via two parallel transport devices 3-1, 3-2. These can each have their own drive or be operated by a common drive. If each of the transport devices 3-1, 3-2 has its own drive, it can be provided that they are operated independently of each other or that they are coupled with each other, for example electronically. Alternatively, the two parallel rows 1-1, 1-2 can also be transported to the grouping module 20 via a common transport device (not shown), which is designed to be correspondingly wide.

The piece goods fed in two rows 1-1, 1-2 are preferably handled by a manipulator (not shown), which grabs piece goods 2 from one of the rows 1-1 or 1-2 each depending on the layer scheme to be formed. For example, it can be provided, that the manipulator alternately seizes piece goods from each of the rows 1-1, 1-2. Depending on the layer scheme to be formed, it may also be necessary for the manipulator to seize at least one piece good from only one of the two rows 1-1 or 1-2 several times in succession, before it uses the other row 1-2 or 1-1 again.

For each of the two rows 1-1, 1-2 a sensor arrangement is provided, each comprising a sensor 40, 40* with a corresponding movement range 45, 45* and a corresponding detection range 50, 50*. In particular, the sensors 40, 40*, which preferably operate optically, are designed in such a way that they can detect light-dark contrasts within a definable distance range. This ensures that the sensor 40 always only detects piece goods 2 of formation F-1 in the detection range 50 and that the sensor 40* always only detects piece goods 2 of formation F-2 in the detection range 50*.

With regard to the different movement sequences of the sensors 40, 40* possible with this arrangement, reference is made to the description of FIGS. 1 to 27.

Figures 29, 30:
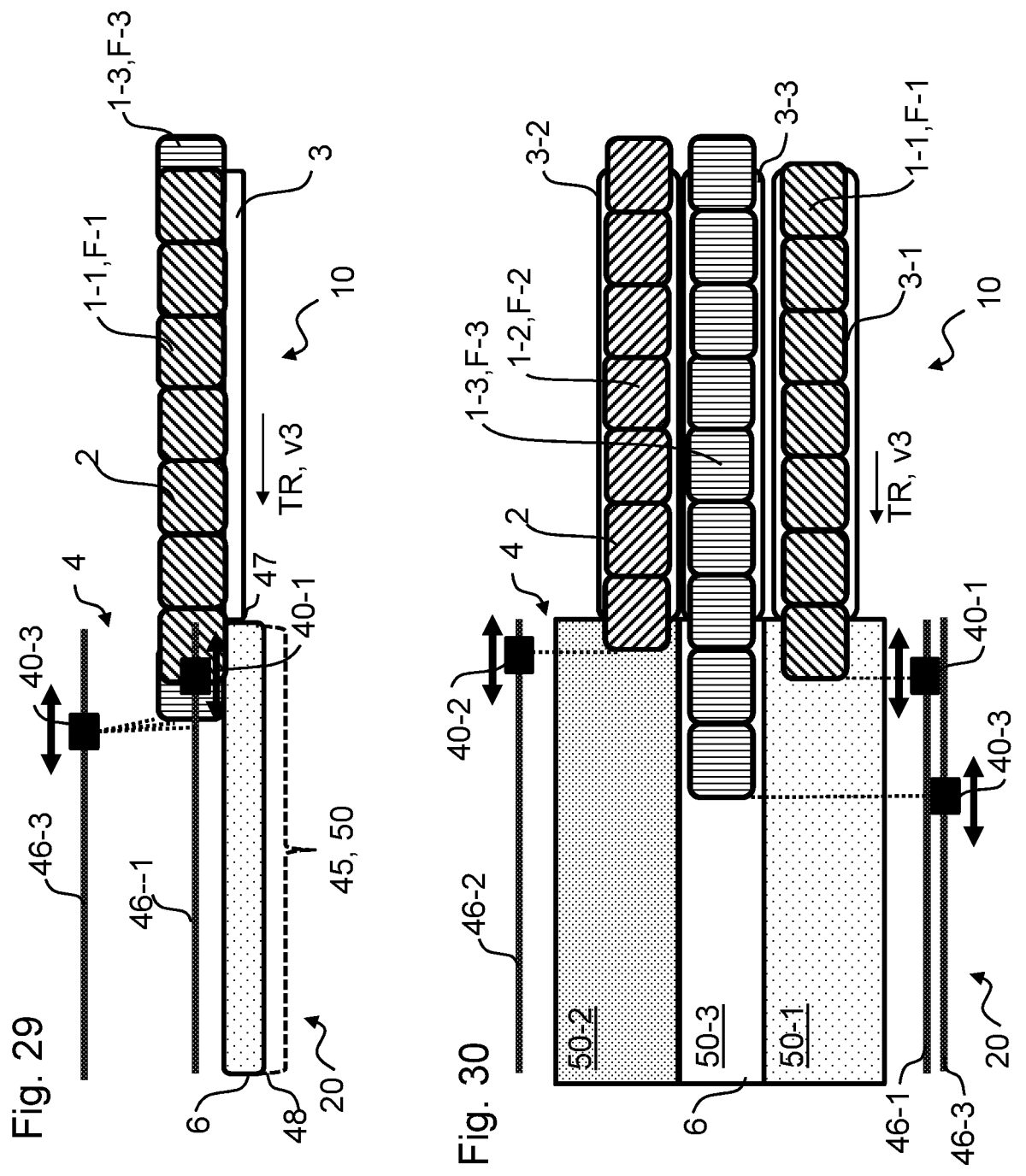

FIG. 29 schematically shows a lateral representation of a sixth embodiment of an automated position detection/calibration within a grouping module 20 of a handling apparatus 10 according to the invention and FIG. 30 shows a representation of this embodiment from above.

Here, piece goods 2 are supplied in three parallel rows 1-1, 1-2, 1-3 or formations F-1, F-2, F-3. The piece goods 2 can be supplied via three parallel transport devices 3-1, 3-2, 3-3 (see FIG. 30). These can each have their own drive or be operated by a common drive. If each of the transport devices 3-1, 3-2, 3-3 has its own drive, it can be provided that these are operated independently of each other or that they are coupled to each other, for example electronically. Alternatively, the three parallel rows 1-1, 1-2, 1-3 can also be transported to the grouping module 20 via a common transport device 3, which is designed appropriately wide (see FIG. 29).

The piece goods fed in three rows 1-1, 1-2, 1-3 are preferably handled by a manipulator (not shown), which grabs piece goods 2 from one row 1-1, 1-2 or 1-3 each, depending on the layer scheme to be formed. For example, the manipulator may alternately grab piece goods from rows 1-1, 1-2 and 1-3. Depending on the layer scheme to be formed, it may also be necessary for the manipulator to grab at least one piece good from only one of the rows 1-1, 1-2 or 1-3 several times in succession, before it uses one of the other rows 1-1, 1-2 or 1-3 again.

For each of rows 1-1, 1-2 or 1-3, a sensor arrangement is provided, each comprising a sensor 40-1, 40-2, 40-3 arranged on a running rail 46-1, 46-2, 46-3 with a corresponding movement range 45 (shown only in FIG. 29) and a corresponding detection range 50, 50-1, 50-2, 50-3. In particular, the sensors 40-1, 40-2, 40-3, which are preferably working optically, are designed in such a way that they are each able to detect light-dark contrasts within a definable distance range.

The sensor 40-3, which detects the piece goods 2 of the middle row 1-3, is also arranged laterally next to the horizontal conveying device 6 outside the seizing range 4 of the manipulator (not shown). However, the sensor 40-3 is arranged above the sensor 40-2, so that the sensor 40-3 is at an oblique angle to the piece goods 2 transported as a closed formation F-3 within the middle row 1-3. The sensor 40-3 must be designed, arranged and/or adjusted accordingly in order to reliably detect the piece goods 2 transported in the middle row 1-3. With the described arrangement it is ensured that the sensor 40-1 always only detects piece goods 2 of formation F-1 in the detection range 50-1, while the sensor 40-2 always only detects piece goods 2 of formation F-2 in the detection range 50-2 and the sensor 40-3 always only detects piece goods 2 of formation F-3 in the detection range 50-3.

With regard to the different movement sequences of the sensors 40-1, 40-2, 40-3 possible with this arrangement and the control by a control device not shown in FIGS. 29 and 30, reference is made to the description of FIGS. 1 to 27.

In all the embodiments described here, a movement sequence is predefined for the manipulator, which movement sequence is adapted on the basis of the data determined by sensors in order to compensate for deviations in the supply of piece goods 2 and their exact positioning within the supply. In particular, depending on the available computing power, it may be provided that the data are only used for the correction of the movement sequence of the manipulator for a cycle to be seized in a later following manipulation step. The primary reason for this is that, as a rule, the movements of the manipulator 5 are already pre-calculated when it seizes the respective group of piece goods 2 in order to subsequently position it. A correction based on a position deviation detected by the sensors 40, 40* is usually not possible at this time, but is used for the recalculation of the next subsequent operating cycle of the manipulator 5.

Based on the data determined by the sensors, optionally deviations in the dimensions of the piece goods 2 and/or the transport speed v3 and/or the conveying speed v6 and/or deviations due to piece goods twisted about their vertical axis etc. can also be detected. The data can be used accordingly to correct the movement profile of subsequent manipulation steps in their entirety.

The embodiments, examples and variants of the preceding paragraphs, the claims or the following description and the figures, including their different views or respective individual characteristics, may be used independently of each other or in any combination. Characteristics which are described in connection with an embodiment are applicable to all embodiments, provided that the characteristics are not incompatible.

The invention was described with reference to a preferred embodiment. However, it is conceivable for a person skilled in the art that modifications or alterations of the invention can be made without leaving the scope of protection of the following claims.

LIST OF REFERENCE NUMERALS

1; 1-1; 1-2; 1-3 row
2 piece good 2f defective/tilted over piece good
2n subsequent piece good
2v leading piece good/foremost located piece good
2v1; 2v2 leading piece good/foremost located piece good
3; 3-1; 3-2 transport device
4 seizing range
5 manipulator
6 horizontal conveying device
8-1; 8-2 group
9 group
9v foremost group
9n subsequent group
10 handling apparatus
12 control device
20 grouping module
25 gap
26 gap
26k shortened gap
26v enlarged gap
30 forward-facing edge
40; 40*; 40-1; 40-2; 40-3 sensor
41; 41* light barrier
42; 42* laser edge scanner
45; 45*; 45-1; 45-2; 45-3 movement range
46; 46*, 46-1; 46-2; 46-3 running rail
47; 47* starting point
48; 48* end point
50; 50*; 50-1; 50-2; 50-3 detection range
52 correction device
53 gripper
54 pusher
F; F-1; F-2; F-3 formation
L1; L2; Ln; L30 length
L26 length/size of a gap
L26k length/size of a shortened gap
L26v increased size/length
P target position
TR transport direction
v3 transport speed
v6 speed

The invention claimed is:

1. An apparatus (10) for handling moved piece goods (2), the apparatus (10) comprising:
at least one manipulator (5) for piece goods (2);
at least one transport device (3) wherein the moved piece goods (2) are transportable to a seizing range (4) of the at least one manipulator (5);
at least one movable optical detection device (40) assigned to the seizing range (4) of the at least one manipulator (5), wherein the optical detection device (40) is capable of obtaining space coordinates, position data, or contour data of at least one piece good (2) that is being moved in transport direction (TR),
wherein at least the manipulator (5) or further conveyor components of the apparatus (10) are calibratable, or controllable based on the space coordinates, position data, or contour data; and
wherein in the at least one movable optical detection device (40) is movable independently of the manipulator (5).

2. The apparatus of claim 1, wherein the at least one movable optical detection device (40) is at least temporarily movable parallel to a horizontal conveying device (6) that is assigned to the seizing range (4).

3. The apparatus of claim 2, wherein the at least one movable optical detection device (40) comprises at least one light barrier arrangement (41) with an optical path that is aligned to be transverse to the transport direction (TR) and approximately horizontal or parallel to a support plane or transport plane of the horizontal conveying device (6).

4. The apparatus of claim 3, wherein the light barrier arrangement (41) comprises a reflection light barrier.

5. The apparatus of claim 2, wherein the at least one movable optical detection device (40) comprises at least one edge scanner that provides space coordinates, position data, or contour data for a foremost located piece good (2) or for a contour edge (30) facing forward or backward relative to transport direction (TR).

6. The apparatus claim 2, wherein the at least one movable optical detection device (40) comprises at least one camera with downstream image evaluation that provides space coordinates, position data, or contour data for a foremost located piece good (2), or for a contour edge (30) that faces a forward or backward relative to transport direction (TR).

7. The apparatus of claim 1, wherein the at least one movable optical detection device (40) comprises an independent drive.

8. The apparatus (10) of claim 1, wherein the at least one movable optical detection device (40) is linearly movable, and the manipulator (5) is movable within a two-dimensional plane.

9. The apparatus (10) of claim 8, wherein the manipulator (5) is movable within a three-dimensional space.

10. A method for handling moved piece goods (2), comprising:
transporting the piece goods (2) to a seizing range (4) of at least one manipulator (5);
seizing the at least one transported piece good (2) in the seizing range (4) and spatially separating the seized piece good from the subsequent piece goods (2), and bring the seized piece good (2) into a specified relative target position (P), or target alignment relative to the subsequent piece goods (2);
detecting, by at least one optical detection device (40) movable independently of the at least one manipulator (5), at least space coordinates or a position datum of one of the piece goods (2) that is being moved in transport direction (TR) to the seizing range (4), and providing a position datum to a control unit or an analysis unit (12), wherein at least one movable optical detection device (40) is assigned to the seizing range (4); and
calibrating or controlling the at least the manipulator (5) or further associated conveyor components based on the space coordinates, position data, or contour data.

11. The method of claim 10, further comprising moving the at least one movable optical detection device (40) at least temporarily parallel to a horizontal conveying device (6) that is assigned to the seizing range (4).

12. The method claim 11, further comprising moving the at least one movable optical detection device (40) at least temporarily along, and approximately in synchrony with, a support plane or transport plane of the horizontal conveying device (6).

13. The method of claim 12, further comprising moving the at least one manipulator (5) in the seizing range (4) based on the space coordinates or position data provided by the control unit or analysis unit (12) for one moved piece good (2), or for the piece good's contour edge (30) facing backward relative to transport direction (TR).

14. The method of claim 13, further comprising calibrating the at least one manipulator (5) to seize:
individual, spaced-apart piece goods (2);
spaced-apart groups (9) with two or more piece goods (2);

spaced-apart, equally or differently sized groups (9), each group having the same or different number of piece goods (2) being transported to the seizing range (4), wherein the groups are arranged in an uninterrupted formation (F), or in an interrupted row (1) having equally, or differently sized spaces (25, 26) between consecutive piece goods (2), or groups (9) of piece goods (2).

15. The method claim 12, wherein the seizing step further comprises seizing at least one foremost disposed piece good (2) and spatially separating the seized piece good (2) from the subsequent piece goods (2) based on the space coordinates or position data provided by the control unit or analysis unit (12):
for a piece good (2) that is located foremost in the seizing range (4) or entering foremost into the seizing range (4);
or for a contour edge (30) that faces forward or backward relative to transport direction (TR).

16. The method of claim 15, wherein the at least one movable optical detection device (40) remains stationary for a specified period of time after detecting a contour edge (30), or at least one foremost disposed subsequent piece good, and wherein the at least one movable optical detection device (40) is subsequently guided along in synchrony with the horizontal conveying device (6),
wherein the manipulator generates a signal after seizing and spatially separating at least one piece good (2), whereupon after generating the signal, the movement of the at least one movable optical detection device (40) is stopped, and the at least one movable optical detection device (40) is activated, or
wherein a movement of the at least one movable optical detection device (40) opposite to the transport direction (TR) is triggered, and the at least one movable optical detection device (40) is activated, and wherein the at least one movable optical detection device (40) is moved opposite to the transport direction (TR) until it detects a forward-facing contour edge (30) of a subsequent piece good (2).

17. The method of claim 15, further comprising moving the at least one movable optical detection device (40) to follow the position of the foremost located piece good's (2) contour edge (30) that faces forward in transport direction (TR) at least until the foremost located piece good (2) is seized by the manipulator (5), and separated from the subsequent piece goods (2).

18. The method of claim 17, wherein, the after seizing and separation of the at least one foremost transported piece good (2), moving the at least one movable optical detection device (40) opposite to the transport direction (TR) to the next following piece good's (2) contour edge (30), or of one of the following piece goods' (2) contour edges (30) that faces forward in transport direction (TR), and subsequently moving the optical detection device along approximately in synchrony with a support plane or transport plane of the horizontal conveying device (6) that is assigned to the seizing range (4), and during this step, the movable optical detection device following the position of the foremost located piece good's (2) contour edge (30) that faces forward in transport direction (TR) at least until the piece good (2) is seized by the manipulator (5), and separated from the subsequent piece goods (2).

19. The method of claim 18, further comprising:
calibrating the at least one manipulator (5) based on the space coordinates or position data provided by the control unit or analysis unit (12) for the foremost located piece good (2), or for the piece good's (2) forward-facing contour edge (30), or
calibrating the at least one manipulator (5) based on the space coordinates or position data provided by the control unit or analysis unit (12) for a piece good (2) that has been previously seized by the manipulator (5) wherein the at least one manipulator (5), is calibrated during each of the seizing and separating step.

20. A conveying, processing, or packaging plant for piece goods (2) comprising:
an apparatus (10) comprising;
at least one manipulator (5) for piece goods (2);
at least one transport device (3),
wherein the moved piece goods (2) are transportable to a seizing range (4) of the at least one manipulator (5);
at least one movable optical detection device (40) assigned to the seizing range (4) of the at least one manipulator (5), wherein the at least one movable optical detection device (40) is capable of obtaining space coordinates, position data, or contour data of at least one piece good (2) that is being moved in transport direction (TR),
wherein conveyor lines or manipulation stations for arranging the piece goods into configurations that are processable by the apparatus (10) are disposed upstream from the apparatus (10), and at least one palletizing station for arranging the piece goods (2) that have been grouped, or brought into layer arrangements by the apparatus (10) are disposed downstream from the apparatus (10);
wherein the at least one movable optical detection device (40) is movable independently of the at least one manipulator (5) and wherein the at least one movable optical detection device (40) comprises a discrete drive that is independent of the transport device (3).

21. The conveying, processing, or packaging plant of claim 20, wherein the at least one movable optical detection device (40) is at least temporarily movable parallel to a horizontal conveying device (6) that is assigned to the seizing range (4).

22. The conveying, processing, or packaging plant claim 21, wherein at least the manipulator (5) is calibratable or controllable based on the space coordinates, position data, or contour data.

* * * * *